United States Patent
Wei et al.

(10) Patent No.: US 9,331,565 B2
(45) Date of Patent: May 3, 2016

(54) SWITCHING POWER CONVERSION CIRCUIT AND POWER SUPPLY USING SAME

(71) Applicant: DELTA ELECTRONICS (SHANGHAI) CO., LTD, Shanghai (CN)

(72) Inventors: Dong Wei, Shanghai (CN); Dezhi Jiao, Shanghai (CN); Chin-Tsai Chiang, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 401 days.

(21) Appl. No.: 13/714,394

(22) Filed: Dec. 13, 2012

(65) Prior Publication Data

US 2013/0100713 A1    Apr. 25, 2013

Related U.S. Application Data

(63) Continuation-in-part of application No. 12/836,575, filed on Jul. 14, 2010, now Pat. No. 8,358,517.

(30) Foreign Application Priority Data

Nov. 28, 2012  (CN) .......................... 2012 1 0495105

(51) Int. Cl.
*H02M 1/36*    (2007.01)
*H02M 1/42*    (2007.01)
(Continued)

(52) U.S. Cl.
CPC .............. *H02M 1/36* (2013.01); *H02M 1/4225* (2013.01); *H02M 3/33507* (2013.01); *H02M 2001/0006* (2013.01); *H02M 2001/007* (2013.01); *H02M 2001/0032* (2013.01); *Y02B 70/126* (2013.01); *Y02B 70/16* (2013.01)

(58) Field of Classification Search
CPC ................ H02M 1/36; H02M 1/4225; H02M 2001/007; H02M 2001/0006; H02M 2001/0032

See application file for complete search history.

(56) References Cited

U.S. PATENT DOCUMENTS

| | | | | |
|---|---|---|---|---|
| 5,867,373 A | * | 2/1999 | Lohrer | H02M 3/33507 348/E5.127 |
| 6,081,104 A | * | 6/2000 | Kern | H02J 9/065 320/101 |
| 7,911,815 B2 | * | 3/2011 | Wang | H02M 3/33523 363/21.12 |

(Continued)

FOREIGN PATENT DOCUMENTS

| | | |
|---|---|---|
| CN | 1319940 A | 10/2001 |
| CN | 1379536 | 11/2001 |

(Continued)

Primary Examiner — Timothy J Dole
Assistant Examiner — Yusef Ahmed

(57) ABSTRACT

A switching power conversion circuit having a two-stage power circuit topology and capable of performing power factor correction is disclosed. In a case that the electrical energy of the switching power conversion circuit needs not to be provided to the system circuit, for example the load and the electronic device fails to be operated, the switching power conversion circuit will be adaptively disabled. As a consequence, the switching power conversion circuit could achieve a power-saving purpose. Moreover, the switching power conversion circuit could be applied to a power supply. When the electronic device is not in use, the power supply has reduced power consumption, thereby achieving a power-saving purpose.

9 Claims, 12 Drawing Sheets

(51) Int. Cl.
*H02M 3/335* (2006.01)
*H02M 1/00* (2006.01)

(56) References Cited

U.S. PATENT DOCUMENTS

| | | | | |
|---|---|---|---|---|
| 8,027,174 B2* | 9/2011 | Ryu | ............... | H02M 1/4225 363/16 |
| 8,693,213 B2* | 4/2014 | Jungreis | ............ | H02M 1/4241 363/17 |
| 2007/0253228 A1 | 11/2007 | Morota | | |
| 2008/0123378 A1* | 5/2008 | Chiang | ............ | H02M 1/32 363/80 |
| 2008/0298094 A1* | 12/2008 | Cuadra et al. | ...... | H02M 3/33561 363/21.12 |
| 2009/0189571 A1* | 7/2009 | Lai | ............... | H02J 7/022 320/162 |
| 2009/0251934 A1* | 10/2009 | Shteynberg | ............ | H02M 3/155 363/81 |
| 2009/0262561 A1* | 10/2009 | Mayell | ............ | H02M 3/3385 363/21.12 |
| 2010/0133905 A1* | 6/2010 | Chang | ............ | H02J 1/08 307/31 |
| 2010/0157638 A1* | 6/2010 | Naiknaware | ........ | H02M 7/4807 363/131 |
| 2010/0225289 A1* | 9/2010 | Chang | ............ | H02M 3/28 323/282 |
| 2010/0226151 A1* | 9/2010 | Chen | ............ | H02M 3/335 363/21.12 |
| 2011/0013431 A1* | 1/2011 | Chiang | ............ | H02M 1/36 363/49 |
| 2011/0025289 A1* | 2/2011 | Wang | ............... | H02M 1/4225 323/285 |
| 2011/0156643 A1* | 6/2011 | Chen | ............... | B60L 11/1811 320/109 |
| 2011/0299309 A1* | 12/2011 | Chen | ............... | H02M 3/33569 363/37 |
| 2011/0308769 A1* | 12/2011 | Huang | ............ | H02M 3/33569 165/96 |
| 2012/0112722 A1* | 5/2012 | Sakda | ............ | H02J 1/102 323/293 |
| 2012/0306408 A1* | 12/2012 | Chung | ............ | G01R 31/2849 315/307 |
| 2013/0088196 A1* | 4/2013 | Chen | ............... | B60L 11/1811 320/109 |

FOREIGN PATENT DOCUMENTS

| | | |
|---|---|---|
| CN | 1352482 A | 6/2002 |
| CN | 1819426 A | 8/2002 |
| CN | 1368787 A | 9/2002 |
| CN | 1421986 A | 6/2003 |
| CN | 101090238 A | 12/2007 |
| CN | 101136592 A | 3/2008 |
| CN | 101207333 A | 6/2008 |
| CN | 101340155 | 1/2009 |
| CN | 100541996 C | 9/2009 |
| CN | 101964599 A | 2/2011 |
| CN | 101989818 A | 3/2011 |
| CN | 102545614 A | 7/2012 |
| JP | 2002-078340 | 3/2002 |
| JP | 2004-135372 | 4/2004 |
| JP | 2007-181362 | 7/2007 |
| TW | 200824250 A | 6/2008 |

* cited by examiner

SWITCHING POWER CONVERSION CIRCUIT AND POWER SUPPLY USING SAME

CROSS-REFERENCE TO RELATED APPLICATIONS

The present application is a continuation-in-part of U.S. patent application Ser. No. 12/836,575 entitled "SWITCHING POWER CONVERSION CIRCUIT AND POWER SUPPLY USING SAME" filed on Jul. 14, 2010, which claims the benefit of Taiwan Patent Application No. 098124296, filed on Jul. 17, 2009. The entire disclosures of the prior applications are incorporated herein by reference in their entireties.

FIELD OF THE INVENTION

The present disclosure relates to a power conversion circuit, and more particularly to a two-stage switching power conversion circuit and a power supply using the same.

BACKGROUND OF THE INVENTION

With increasing industrial development, diverse functional electronic devices are developed gradually. The diverse functional electronic devices not only meet different requirements of people and are into people's daily life, but also make people's life more convenient.

As known, a power supply is essential for many electronic devices such as personal computers, industrial computers, servers, communication products or network products. Usually, the user may simply plug a power supply into an AC wall outlet commonly found in most homes or offices so as to receive an AC voltage. The power supply will convert the AC voltage into a regulated DC output voltage for powering the electronic device. The regulated DC output voltage is transmitted to the electronic device through a power cable.

Generally, power supply apparatuses are classified into two types, i.e. a linear power supply and a switching power supply (SPS). A linear power supply principally comprises a transformer, a diode rectifier and a capacitor filter. The linear power supply is advantageous due to its simplified circuitry and low fabricating cost. Since the linear power supply has bulky volume, the linear power supply is not applicable to a slim-type electronic device. In addition, the converting efficiency of the linear power supply is too low to comply with the power-saving requirements. In comparison with the linear power supply, the switching power supply has reduced volume but increased converting efficiency. That is, the switching power supply is applicable to the slim-type electronic device and could comply with the power-saving requirements.

Although the switching power supply has higher converting efficiency, there are still some drawbacks. For example, even if the electrical energy is not required to be transmitted to the system circuit of the electronic device, the switching power supply is continuously operated to transmit an output voltage having the rated voltage value. In other words, the switching power supply continuously consumes electrical energy even if no electrical energy is transmitted to the system circuit of the electronic device. Under this circumstance, the conventional switching power supply fails to meet the power-saving requirement.

Therefore, there is a need of providing an improved power conversion circuit so as to obviate the drawbacks encountered from the prior art.

SUMMARY OF THE INVENTION

It is an object of the present disclosure to provide a switching power conversion circuit and a power supply having reduced power consumption when the system circuit of the electronic device or load is not in use, thereby achieving a power-saving purpose. The switching power conversion circuit has a two-stage power circuit topology and is capable of performing power factor correction. In a case that the electrical energy of the switching power conversion circuit needs not to be provided to the system circuit, for example the load and the electronic device fails to be operated, the switching power conversion circuit will be adaptively disabled. As a consequence, the switching power conversion circuit could achieve a power-saving purpose. Moreover, the switching power conversion circuit could be applied to a power supply. When the electronic device is not in use, the power supply has reduced power consumption, thereby achieving a power-saving purpose.

In accordance with an aspect of the present disclosure, there is provided a switching power conversion circuit for receiving the energy of an input voltage and generating an output voltage to a system circuit. The switching power conversion circuit comprises a first-stage power circuit, a first feedback circuit, a second-stage power circuit, a second feedback circuit and a controlling unit. The first-stage power circuit is configured to perform a power factor correction and convert the input voltage into a bus voltage. The first feedback circuit is connected to the first-stage power circuit for generating a first feedback signal according to the bus voltage. The second-stage power circuit is connected to the first-stage power circuit for converting the bus voltage into the output voltage. The second feedback circuit is connected to the second-stage power circuit for generating a second feedback signal according to the output voltage. The controlling unit is connected to the first-stage power circuit, the second-stage power circuit, the first feedback circuit, the second feedback circuit and the system circuit for controlling the operations of the first-stage power circuit according to the first feedback signal, controlling the operations of the second-stage power circuit according to the second feedback signal and receiving a power-status signal issued from the system circuit. If the power-status signal is in an off status, the second-stage power circuit is disabled according to the power-status signal under the control of the controlling unit, thereby the switching power conversion circuit stops providing electrical energy to the system circuit.

In accordance with another aspect of the present disclosure, there is provided a switching power conversion circuit for receiving the energy of an input voltage and generating an output voltage. The output voltage is transmitted to a system circuit of an electronic device through a power connector. The switching power conversion circuit includes a first-stage power circuit, a first feedback circuit, a second-stage power circuit, a second feedback circuit and a controlling unit. The first-stage power circuit is configured to perform a power factor correction and convert the input voltage into a bus voltage. The first feedback circuit is connected to the first-stage power circuit for generating a first feedback signal according to the bus voltage. The second-stage power circuit is connected to the first-stage power circuit for converting the bus voltage into the output voltage. The second feedback circuit is connected to the second-stage power circuit for generating a second feedback signal according to the output voltage. The controlling unit is connected to the first-stage power circuit, the second-stage power circuit, the first feedback circuit and the second feedback circuit, and has a power-status detecting circuit connected to a power output terminal of the second-stage power circuit. The power-status detecting circuit is used for discriminating whether electrical energy of the switching power conversion circuit needs to be transmitted to the system circuit, thereby generating a corresponding power-status detecting signal. The controlling unit controls the operations of the first-stage power circuit and the operations of the second-stage power circuit according to the power-status detecting signal, the first feedback signal and the second feedback signal. When the power-status detecting signal is in an off status, the second-stage power circuit is disabled or intermittently enabled according to the power-status detecting signal under the control of the controlling unit, so that the voltage values of the output voltage are lower than the rated values thereof or equal to zero, and the switching power conversion circuit stops providing or intermittently provides electrical energy to the system circuit.

In accordance with a further aspect of the present disclosure, there is provided a power supply comprising a switching power conversion circuit for receiving the energy of an input voltage and generating an output voltage. The output voltage is transmitted to a system circuit of an electronic device through a power connector. The switching power conversion circuit comprises a first-stage power circuit, a first feedback circuit, a second-stage power circuit, a second feedback circuit and a controlling unit. The first-stage power circuit is configured to perform a power factor correction and convert the input voltage into a bus voltage. The first feedback circuit is connected to the first-stage power circuit for generating a first feedback signal according to the bus voltage. The second-stage power circuit is connected to the first-stage power circuit for converting the bus voltage into the output voltage. The second feedback circuit is connected to the second-stage power circuit for generating a second feedback signal according to the output voltage. The controlling unit is connected to the first-stage power circuit, the second-stage power circuit, the first feedback circuit and the second feedback circuit. The controlling unit controls the operations of the first-stage power circuit and the operations of the second-stage power circuit according to the first feedback signal, the second feedback signal and an on and off status of the system circuit. When the power-status detecting signal is in off status, the second-stage power circuit is disabled or intermittently enabled under the control of the controlling unit, so that the voltage values of the output voltage are lower than the rated values thereof or equal to zero, and the switching power conversion circuit stops providing or intermittently provides electrical energy to the system circuit.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
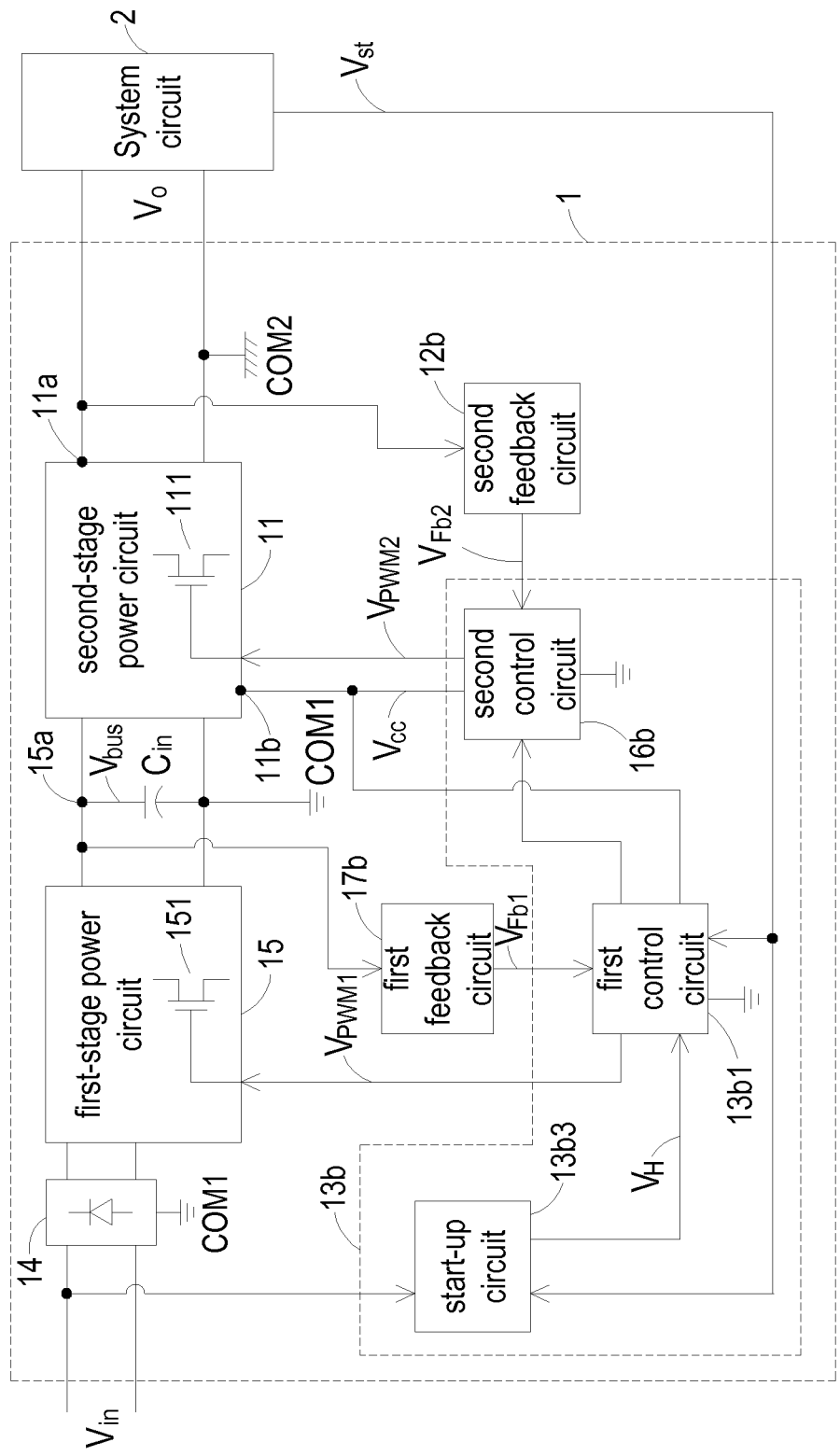
FIG. 1 is a schematic circuit diagram of a switching power conversion circuit according to a first embodiment of the present disclosure.

FIG. 1 is a schematic circuit diagram of a switching power conversion circuit according to a first embodiment of the present disclosure. The switching power conversion circuit 1 is used for receiving the energy of an input voltage $V_{in}$, for example an AC voltage, and generating a rated output voltage $V_o$ for providing the energy to a system circuit 2 of an electronic device. The switching power conversion circuit 1 can be a two-stage power circuit topology applied to a power supply and includes but not limited to a first-stage power circuit 15 and a second-stage power circuit 11. In addition, the switching power conversion circuit 1 further comprises a first control circuit 13$b$1, a second control circuit 16$b$, a first feedback circuit 17$b$, a second feedback circuit 12$b$, a bus capacitor $C_{in}$, an input rectifier circuit 14 and a start-up circuit 13$b$3. The input rectifier circuit 14 is connected to the power input terminal of the switching power conversion circuit 1, the power input terminal of the first-stage power circuit 15 and a first common terminal $COM_1$ for rectifying the input voltage $V_{in}$.

The first-stage power circuit 15 is capable of performing power factor correction. Namely, the first-stage power circuit 15 can change the current distribution and envelope curve drawn by the input current of the power input terminal of the switching power conversion circuit 1 to match with the waveform of the input voltage $V_{in}$. The first-stage power circuit 15 comprises a first switching circuit 151 for receiving the energy of the input voltage $V_{in}$. By alternatively conducting or shutting off the first switching circuit 151, the input voltage $V_{in}$ is converted into a bus voltage $V_{bus}$. One end of the bus capacitor $C_{in}$ is connected to the power output terminal of the first-stage power circuit 15, and the other end of the bus capacitor $C_{in}$ is connected to the first common terminal $COM_1$ for storing energy and filtering the bus voltage $V_{bus}$.

The first feedback circuit 17b is connected to the power output terminal 15a of the first-stage power circuit 15 and the first control circuit 13b1 and generates a first feedback signal $V_{fb1}$ according to the bus voltage $V_{bus}$. The first control circuit 13b1 is connected to the control terminal of the first switching circuit 151 and the output terminal of the first feedback circuit 17b and connected to a first auxiliary power output terminal 11b of the second-stage power circuit 11, the start-up circuit 13b3 and the system circuit 2. According to the first feedback signal $V_{fb1}$, the first control circuit 13b1 generates a first pulse width modulation control signal $V_{PWM1}$. According to the first pulse width modulation control signal $V_{PWM1}$, the first switching circuit 151 is conducted or shut off under control. As such, the energy of the input voltage $V_{in}$ is converted into the bus voltage $V_{bus}$, and the first control circuit 13b1 also receives the power-status signal $V_{st}$ issued from the system circuit 2.

The second-stage power circuit 11 is connected to the first-stage power circuit 15, the bus capacitor $C_{in}$ and the system circuit 2 and comprises a second switching circuit 111 for receiving the energy of the bus voltage $V_{bus}$. By alternatively conducting or shutting off the second switching circuit 111, the bus voltage $V_{bus}$ is converted into an output voltage $V_o$ and a first auxiliary voltage $V_{cc}$ to be outputted through the power output terminal 11a and the first auxiliary power output terminal 11b of the second-stage power circuit 11, respectively. The first auxiliary power output terminal 11b of the second-stage power circuit 11 is connected to the first control circuit 13b1 and the second control circuit 16b. The second feedback circuit 12b is connected to the power output terminal 11a of the second-stage power circuit 11 and the second control circuit 16b and generates a second feedback signal $V_{fb2}$ according to the output voltage $V_o$. The second control circuit 16b is connected to the control terminal of the second switching circuit 111, the first auxiliary power output terminal 11b of the second-stage power circuit 11 and the output terminal of the second feedback circuit 12b and connected to the first control circuit 13b1. According to the second feedback signal $V_{fb2}$, the second control circuit 16b generates a second pulse width modulation control signal $V_{PWM2}$. According to the second pulse width modulation control signal $V_{PWM2}$, the second switching circuit 111 is conducted or shut off under control of the second control circuit 16b. As such, the energy of the bus voltage $V_{bus}$ is converted into the output voltage $V_o$ and the first auxiliary voltage $V_{cc}$.

The start-up circuit 13b3, the first control circuit 13b1 and the second control circuit 16b are collectively defined as a controlling unit 13b, but it is not limited thereto. The start-up circuit 13b3 is connected to the input terminal of the input rectifier circuit 14, the system circuit 2 and the first control circuit 13b1. According to the power-status signal $V_{st}$, the energy of the input voltage $V_{in}$ is converted into a start-up voltage $V_H$ by the start-up circuit 13b3. The start-up voltage $V_H$ is supplied to the first control circuit 13b1 from the start-up circuit 13b3, so that the energy of the input voltage $V_{in}$ can be transmitted to the first auxiliary power output terminal 11b of the second-stage power circuit 11 through the first control circuit 13b1. As such, the first auxiliary voltage $V_{cc}$ at the first auxiliary power output terminal 11b of the second-stage power circuit 11 is boosted to a voltage value higher than a first operating voltage value of the first control circuit 13b1. Therefore, the first control circuit 13b1 is enabled according to the first auxiliary voltage $V_{cc}$, and the first control circuit 13b1 can issue a corresponding control signal to drive the second control circuit 16b. Next, the operations of the switching power conversion circuit 1 will be described with reference to FIG. 1.

When the power-status signal $V_{st}$ is in a high-level status, the electrical energy of the switching power conversion circuit 1 should be provided to the system circuit 2. Meanwhile, the start-up circuit 13b3 is enabled according to the status of the power-status signal $V_{st}$, and the energy of the input voltage $V_{in}$ is converted into the start-up voltage $V_H$ having a non-zero voltage value (i.e. higher than zero voltage value) by the start-up circuit 13b3 and transmitted to the first control circuit 13b1. The energy of the start-up voltage $V_H$ is transmitted to the first auxiliary power output terminal 11b of the second-stage power circuit 11 by the first control circuit 13b1, so that the first auxiliary voltage $V_{cc}$ at the first auxiliary power output terminal 11b of the second-stage power circuit 11 is boosted to a voltage value higher than the first operating voltage value of the first control circuit 13b1. As such, the first control circuit 13b1 is enabled to control the operations of the first-stage power circuit 15. According to the first feedback signal $V_{fb1}$, the first control circuit 13b1 is continuously operated to issue the first pulse width modulation control signal $V_{PWM1}$ to the first switching circuit 151. According to the first pulse width modulation control signal $V_{PWM1}$, the first switching circuit 151 is conducted or shut off under control of the first control circuit 13b1. As such, the energy of the input voltage $V_{in}$ is converted into the bus voltage $V_{bus}$, and the bus voltage $V_{bus}$ is maintained at a rated level. Meanwhile, the first control circuit 13b1 issues a control signal (not shown in FIG. 1) to the second control circuit 16b for driving the second control circuit 16b. According to the second feedback signal $V_{fb2}$, the second control circuit 16b generates a second pulse width modulation control signal $V_{PWM2}$. According to the second pulse width modulation control signal $V_{PWM2}$, the second switching circuit 111 is conducted or shut off under control of the second control circuit 16b. As such, the energy of the bus voltage $V_{cc}$, is converted into the output voltage $V_o$ and the first auxiliary voltage $V_{cc}$, and the energy of the output voltage $V_o$ and the first auxiliary voltage $V_{cc}$ are provided to the system circuit 2 and the first control circuit 13b1 and the second control circuit 16b, respectively. Furthermore, the output voltage $V_o$ and the first auxiliary voltage $V_{cc}$ outputted from the second-stage power circuit 11 are maintained at the rated values under control of the second control circuit 16b.

When the power-status signal is switched from the high-level status to a zero-level or low-level status (i.e. an off status), it is meant that the electrical energy of the switching power conversion circuit 1 needs not to be provided to the system circuit 2. Meanwhile, the start-up circuit 13b3 is disabled according to the off status of the power-status signal $V_{st}$ and the voltage value of the start-up voltage $V_H$ is zero so as to reduce the unnecessary energy loss. Even if the energy of the input voltage $V_{in}$ is continuously transmitted to the start-up circuit 13b3, the energy of the input voltage $V_{in}$ fails to be converted into the start-up voltage $V_H$ having a non-zero voltage value by the start-up circuit 13b3. Meanwhile, the first control circuit 13b1 is disabled according to the off status of the power-status signal $V_{st}$, and issues a control signal to the second control circuit 16b for disabling the second control circuit 16b. Accordingly, the first-stage power circuit 15 and the second-stage power circuit 11 are disabled, and the voltage values of the output voltage $V_o$ and the first auxiliary voltage $V_{cc}$ are zero due to the disabling of the second control circuit 16b and the second-stage power circuit 11. Therefore, the switching power conversion circuit 1 stops providing electrical energy to the system circuit 2.

When the electrical energy of the switching power conversion circuit 1 needs to be provided to the system circuit 2 again and the power-status signal $V_{st}$ is switched from the zero-level or low-level status (i.e. an off status) to the high-level status (i.e. an on status), the start-up circuit 13b3 is enabled again according to the on status of the power-status signal $V_{st}$ and the energy of the input voltage $V_{in}$ is converted into the start-up voltage $V_H$ having a non-zero voltage value by the start-up circuit 13b3. The energy of the start-up voltage $V_H$ is transmitted to the first auxiliary power output terminal 11b of the second-stage power circuit 11 by the first control circuit 13b1, so that the first auxiliary voltage $V_{cc}$ at the first auxiliary power output terminal 11b of the second-stage power circuit 11 is boosted to a voltage value higher than the first operating voltage value. As such, the first control circuit 13b1 is enabled again to control the operations of the first-stage power circuit 15, so that the energy of the input voltage $V_{in}$ is converted into the bus voltage $V_{bus}$. Meanwhile, the first control circuit 13b1 issues a control signal (not shown in FIG. 1) to the second control circuit 16b for driving the second control circuit 16b. Under control of the second control circuit 16b, the energy of the bus voltage $V_{bus}$ is converted into the output voltage $V_o$ and the first auxiliary voltage $V_{cc}$, and the energy of the output voltage $V_o$ and the first auxiliary voltage $V_{cc}$ outputted from the second-stage power circuit 11 are provided to the system circuit 2 and the first control circuit 13b1 and the second control circuit 16b, respectively. Furthermore, the output voltage $V_o$ and the first auxiliary voltage $V_{cc}$ are maintained at the rated values.

Figure 2:
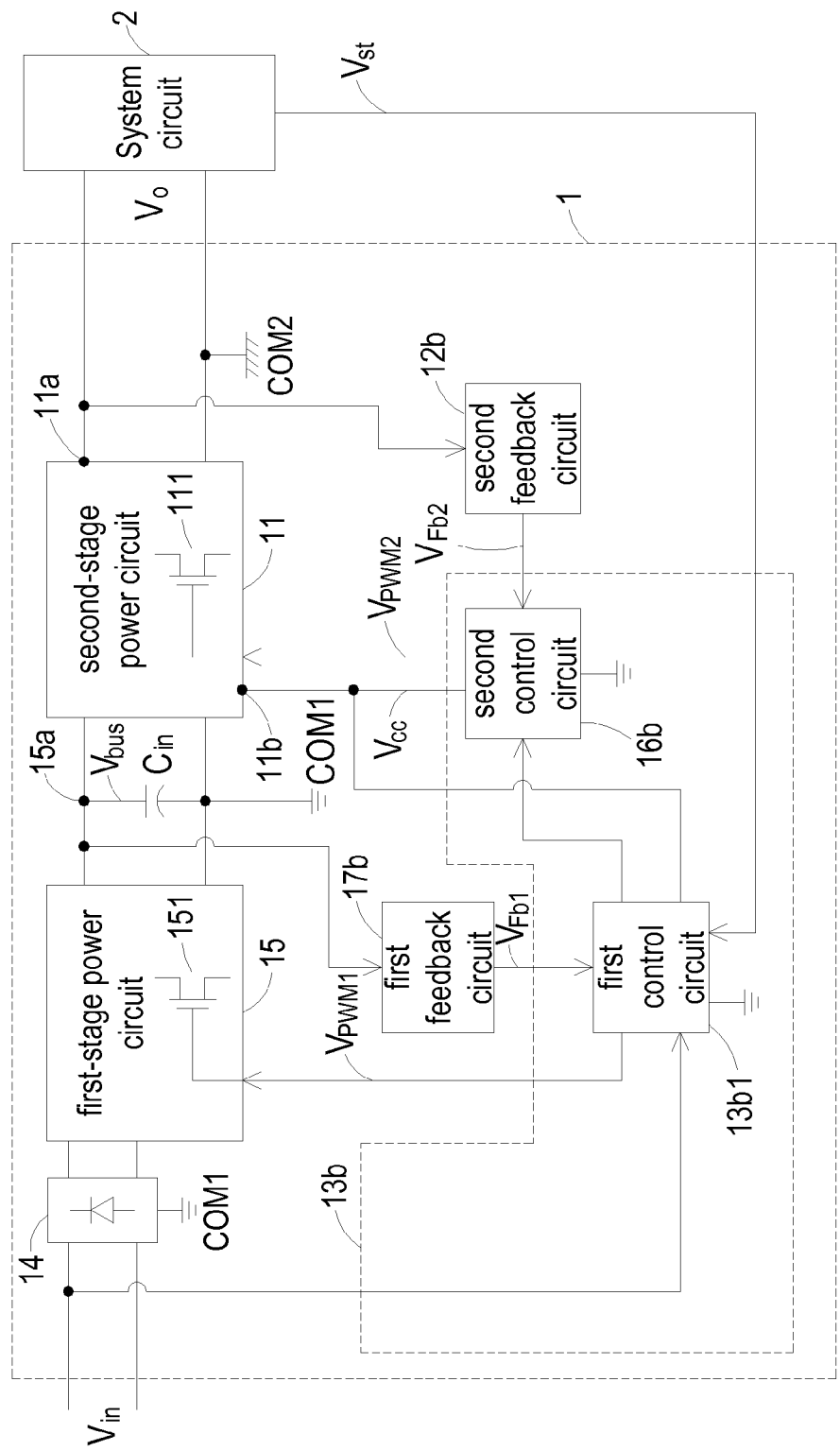
FIG. 2 is a schematic circuit diagram showing an alternative embodiment of the switching power conversion circuit of FIG. 1.

In an alternative embodiment, the start-up circuit 13b3 of the controlling unit 13b as shown in FIG. 1 can be omitted from the switching power conversion circuit 1. For example, the start-up circuit 13b3 can be omitted by combining the start-up circuit 13b3 into the first control circuit 13b1, so that another switching power conversion circuit 1 is provided and shown in FIG. 2. As shown in FIG. 2, the first control circuit 13b1 is connected to the control terminal of the first switching circuit 151, the output terminal of the first feedback circuit 17b, the first auxiliary power output terminal 11b of the second-stage power circuit 11, the second control circuit 16b and the system circuit 2, and is further connected to the input terminal of the input rectifier circuit 14.

When the power-status signal $V_{st}$ is in a high-level status, the electrical energy of the switching power conversion circuit 1 should be provided to the system circuit 2. Meanwhile, the energy of the input voltage $V_{in}$ is transmitted to the first auxiliary power output terminal 11b of the second-stage power circuit 11 by the first control circuit 13b1 according to the on status of the power-status signal $V_{st}$, so that the first auxiliary voltage $V_{cc}$ at the first auxiliary power output terminal 11b of the second-stage power circuit 11 is boosted to a voltage value higher than the first operating voltage value of the first control circuit 13b1. As such, the first control circuit 13b1 is enabled to control the operations of the first-stage power circuit 15. According to the first feedback signal $V_{fb1}$, the first control circuit 13b1 is continuously operated to issue the first pulse width modulation control signal $V_{PWM1}$ to the first switching circuit 151. According to the first pulse width modulation control signal $V_{PWM1}$, the first switching circuit 151 is conducted or shut off under control of the first control circuit 13b1. As such, the energy of the input voltage $V_{in}$ is converted into the bus voltage $V_{bus}$, and the bus voltage $V_{bus}$ is maintained at a rated level. Meanwhile, the first control circuit 13b1 issues a control signal to the second control circuit 16b for driving the second control circuit 16b. According to the second feedback signal $V_{fb2}$, the second control circuit 16b generates a second pulse width modulation control signal $V_{PWM2}$. According to the second pulse width modulation control signal $V_{PWM2}$, the second switching circuit 111 is conducted or shut off under control of the second control circuit 16b. As such, the energy of the bus voltage $V_{bus}$ is converted into the output voltage $V_o$ and the first auxiliary voltage $V_{cc}$, and the energy of the output voltage $V_o$ and the first auxiliary voltage $V_{cc}$ are provided to the system circuit 2 and the first control circuit 13b1 and the second control circuit 16b, respectively. Furthermore, the output voltage $V_o$ and the first auxiliary voltage $V_{cc}$ outputted from the second-stage power circuit 11 are maintained at the rated values under control of the second control circuit 16b.

When the power-status signal $V_{st}$ is switched from the high-level status to a zero-level or low-level status (i.e. an off status), it is meant that the electrical energy of the switching power conversion circuit 1 needs not to be provided to the system circuit 2. Meanwhile, the first control circuit 13b1 is disabled according to the off status of the power-status signal $V_{st}$, and issues a control signal to the second control circuit 16b for disabling the second control circuit 16b. Accordingly, the first-stage power circuit 15 and the second-stage power circuit 11 are disabled, and the voltage values of the output voltage $V_o$ and the first auxiliary voltage $V_{cc}$ are zero due to the disabling of the second control circuit 16b and the second-stage power circuit 11. Therefore, the switching power conversion circuit 1 stops providing electrical energy to the system circuit 2.

Figure 3:
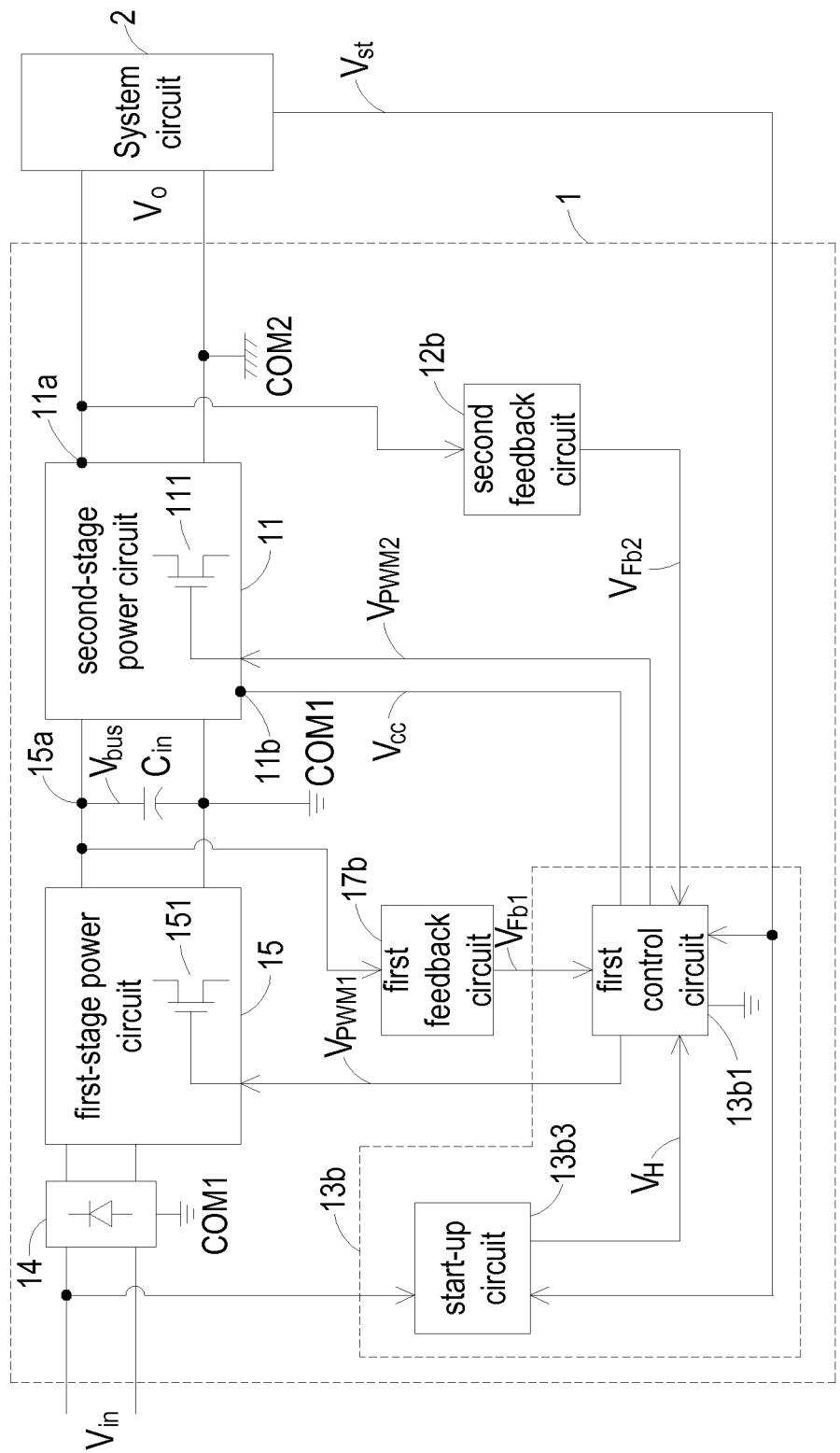
FIG. 3 is a schematic circuit diagram showing another alternative embodiment of the switching power conversion circuit of FIG. 1.

In an alternative embodiment, the second control circuit 16b as shown in FIG. 1 can be integrated into the first control circuit 13b1, so that another switching power conversion circuit 1 is provided and shown in FIG. 3. As shown in FIG. 3, the first control circuit 13b1 is connected to the control terminal of the first switching circuit 151, the output terminal of the first feedback circuit 17b, the first auxiliary power output terminal 11b of the second-stage power circuit 11, the start-up circuit 13b3 and the system circuit 2, and is further connected to the control terminal of the second switching circuit 111 and the output terminal of the second feedback circuit 12b. According to the first feedback signal $V_{fb1}$, the first control circuit 13b1 issues the first pulse width modulation control signal $V_{PWM1}$ to control the ON/OFF operations of the first switching circuit 151. As such, the energy of the input voltage $V_{in}$ is converted into the bus voltage $V_{bus}$. Furthermore, according to the second feedback signal $V_{fb2}$, the first control circuit 13b1 issues a second pulse width modulation control signal $V_{PWM2}$ to control the ON/OFF operations of the second switching circuit 111. As such, the energy of the bus voltage $V_{bus}$ is converted into the output voltage $V_o$ and the first auxiliary voltage $V_{cc}$.

When the power-status signal $V_{st}$ is in a high-level status, the electrical energy of the switching power conversion circuit 1 should be provided to the system circuit 2. Meanwhile, the start-up circuit 13b3 is enabled according to the status of the power-status signal $V_{st}$, and the energy of the input voltage $V_{in}$ is converted into the start-up voltage $V_H$ having a non-zero voltage value (i.e. higher than zero voltage value) by the start-up circuit 13b3 and transmitted to the first control circuit 13b1. The energy of the start-up voltage $V_H$ is transmitted to the first auxiliary power output terminal 11b of the second-stage power circuit 11 by the first control circuit 13b1, so that the first auxiliary voltage $V_{cc}$ at the first auxiliary power output terminal 11b of the second-stage power circuit 11 is boosted to a voltage value higher than the first operating voltage value of the first control circuit 13b1. As such, the first control circuit 13b1 is enabled to control the operations of the first-stage power circuit 15. According to the first feedback signal $V_{fb1}$, the first control circuit 13b1 is enabled to issue the first pulse width modulation control signal $V_{PWM1}$ to the first switching circuit 151. According to the first pulse width modulation control signal $V_{PWM1}$, the first switching circuit 151 is conducted or shut off under control of the first control circuit 13b1. As such, the energy of the input voltage $V_{in}$ is converted into the bus voltage $V_{bus}$, and the bus voltage $V_{bus}$ is maintained at a rated level. Meanwhile, according to the second feedback signal $V_{fb2}$, the first control circuit 13b1 is enabled to issue a second pulse width modulation control signal $V_{PWM2}$ to the second switching circuit 111. According to the second pulse width modulation control signal $V_{PWM2}$, the second switching circuit 111 is conducted or shut off under control of the first control circuit 13b1. As such, the energy of the bus voltage $V_{bus}$ is converted into the output voltage $V_o$ and the first auxiliary voltage $V_{cc}$ by the second-stage power circuit 11, and the output voltage $V_o$ and the first auxiliary voltage $V_{cc}$ are maintained at the rated values.

When the power-status signal $V_{st}$ is switched from the high-level status to a zero-level or low-level status (i.e. an off status), it is meant that the electrical energy of the switching power conversion circuit 1 needs not to be provided to the system circuit 2. Meanwhile, the start-up circuit 13b3 is disabled according to the off status of the power-status signal and the voltage value of the start-up voltage $V_H$ is zero so as to reduce the unnecessary energy loss. Even if the energy of the input voltage $V_{in}$ is continuously transmitted to the start-up circuit 13b3, the energy of the input voltage $V_{in}$ fails to be converted into the start-up voltage $V_H$ having a non-zero voltage value by the start-up circuit 13b3. Meanwhile, the first control circuit 13b1 is disabled according to the off status of the power-status signal $V_{st}$. Accordingly, the first-stage power circuit 15 and the second-stage power circuit 11 are disabled, and the voltage values of the output voltage $V_o$ and the first auxiliary voltage $V_{cc}$ are zero due to the disabling of the first control circuit 13b1 and the second-stage power circuit 11. Therefore, the switching power conversion circuit 1 stops providing electrical energy to the system circuit 2.

Figure 4:
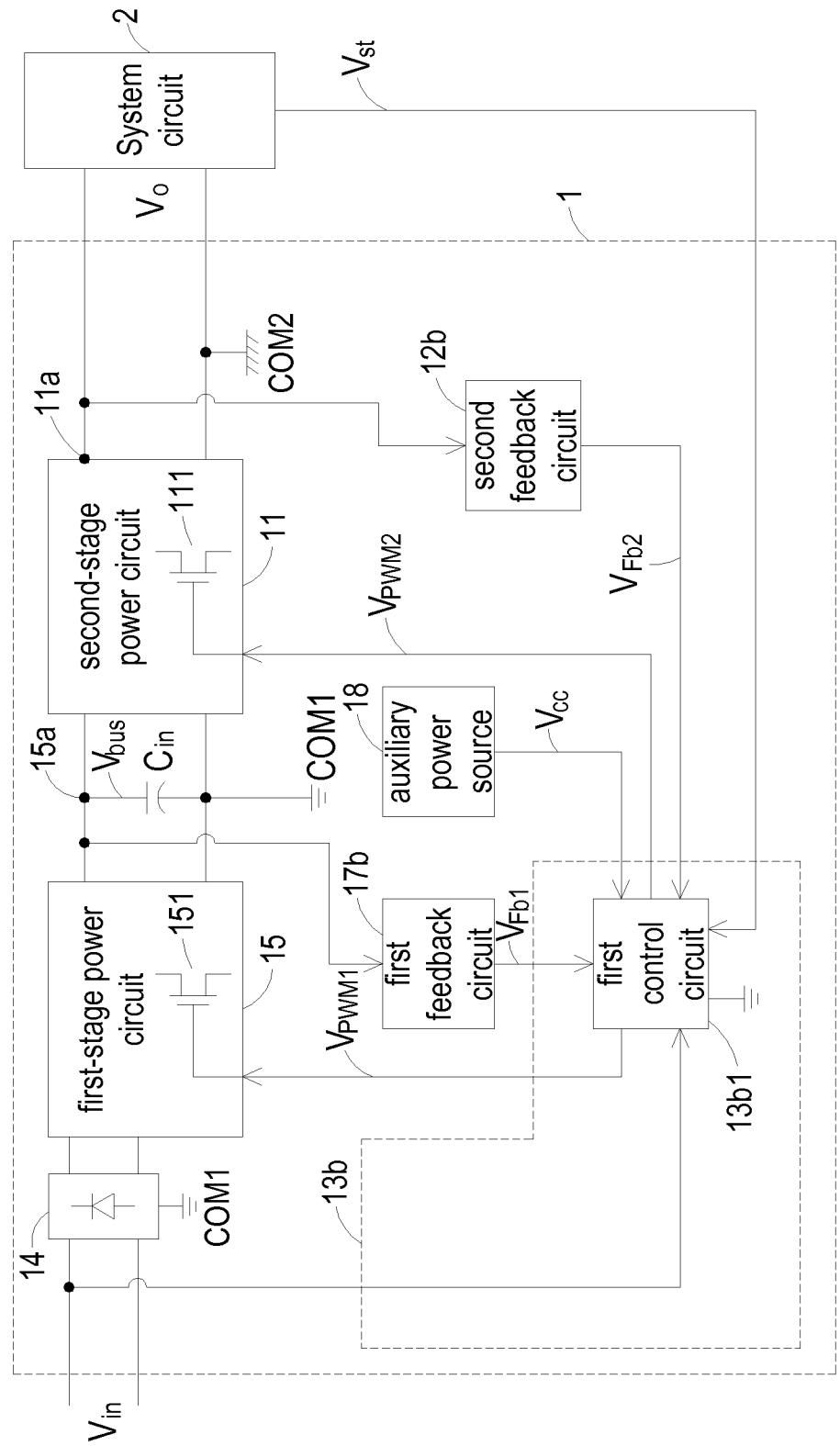
FIG. 4 is a schematic circuit diagram showing an alternative embodiment of the switching power conversion circuit of FIG. 3.

In an alternative embodiment, the start-up circuit 13b3 of the controlling unit 13b as shown in FIG. 3 can be omitted from the switching power conversion circuit 1. For example, the start-up circuit 13b3 can be omitted by combining the start-up circuit 13b3 into the first control circuit 13b1, so that another switching power conversion circuit 1 is provided and shown in FIG. 4. As shown in FIG. 4, the first control circuit 13b1 is connected to the control terminal of the first switching circuit 151, the output terminal of the first feedback circuit 17b, the control terminal of the second switching circuit 111, the output terminal of the second feedback circuit 12b and the system circuit 2, and is further connected to the input terminal of the input rectifier circuit 14. In this embodiment, the second-stage power circuit 11 as shown in FIG. 4 fails to output the first auxiliary voltage $V_{cc}$, which can be outputted from the second-stage power circuit 11 as shown in FIGS. 1, 2 and 3. Furthermore, the switching power conversion circuit 1 further comprises an auxiliary power source 18. The auxiliary power source 18 is connected to the first control circuit 13b1 for supplying the first auxiliary voltage $V_{cc}$ to the first control circuit 13b1 continuously, thereby allowing the first control circuit 13b1 to operate. In an embodiment, the auxiliary power source 18 can be an additional power source for supplying the first auxiliary voltage $V_{cc}$ or a power source supplying the first auxiliary voltage $V_{cc}$ by drawing the energy from the bus voltage $V_{bus}$.

When the power-status signal $V_{st}$ is in a high-level status, the electrical energy of the switching power conversion circuit 1 should be provided to the system circuit 2. Meanwhile, according to the on status of the power-status signal $V_{st}$, the first control circuit 13b1 is operated by receiving the first auxiliary voltage $V_{cc}$ supplied from the auxiliary power source 18. According to the first feedback signal $V_{fb1}$, the first control circuit 13b1 is continuously operated to issue the first pulse width modulation control signal $V_{PWM1}$ to the first switching circuit 151. According to the first pulse width modulation control signal $V_{PWM1}$, the first switching circuit 151 is conducted or shut off under control of the first control circuit 13b1. As such, the energy of the input voltage $V_{in}$ is converted into the bus voltage $V_{bus}$, and the bus voltage $V_{bus}$ is maintained at a rated level. Meanwhile, according to the second feedback signal $V_{fb2}$, the first control circuit 13b1 generates a second pulse width modulation control signal $V_{PWM2}$. According to the second pulse width modulation control signal $V_{PWM2}$, the second switching circuit 111 is conducted or shut off under control of the first control circuit 13b1. As such, the energy of the bus voltage $V_{bus}$ is converted into the output voltage $V_o$, and the output voltage $V_o$ is maintained at the rated value.

When the power-status signal $V_{st}$ is switched from the high-level status to a zero-level or low-level status (i.e. an off status), it is meant that the electrical energy of the switching power conversion circuit 1 needs not to be provided to the system circuit 2. Meanwhile, according to the off status of the power-status signal $V_{st}$, the first control circuit 13b1 fails to receive the first auxiliary voltage $V_{cc}$ supplied from the auxiliary power source 18 and the first control circuit 13b1 is disabled. Accordingly, the first control circuit 13b1 stops controlling the operations of the first-stage power circuit 15 and the second-stage power circuit 11, and the voltage values of the output voltage $V_o$ is zero due to the disabling of the first control circuit 13b1 and the second-stage power circuit 11. Therefore, the switching power conversion circuit 1 stops providing electrical energy to the system circuit 2.

In the switching power conversion circuit 1 shown in FIG. 4, the switching power conversion circuit 1 employs the auxiliary power source 18 to continuously supply the first auxiliary voltage $V_{cc}$ to the first control circuit 13b1, and the first control circuit 13b1 can determine whether to receive the energy of the first auxiliary voltage $V_{cc}$ according to the status of the power-status signal $V_{st}$. In the switching power conversion circuit 1 shown in FIGS. 1, 2 and 3, the first control circuit 13b1 is operated when the voltage value of the first auxiliary voltage $V_{cc}$ at the first auxiliary power output terminal 11b of the second-stage power circuit 11 is equal to or higher than the first operating voltage value of the first control circuit 13b1. Certainly, the above-mentioned technologies for operating the first circuit 13b1 can be exchanged with each other, and it is not intended to be exhaustive or to be limited to the embodiments as disclosed in FIGS. 1, 2, 3 and 4.

Figure 5:
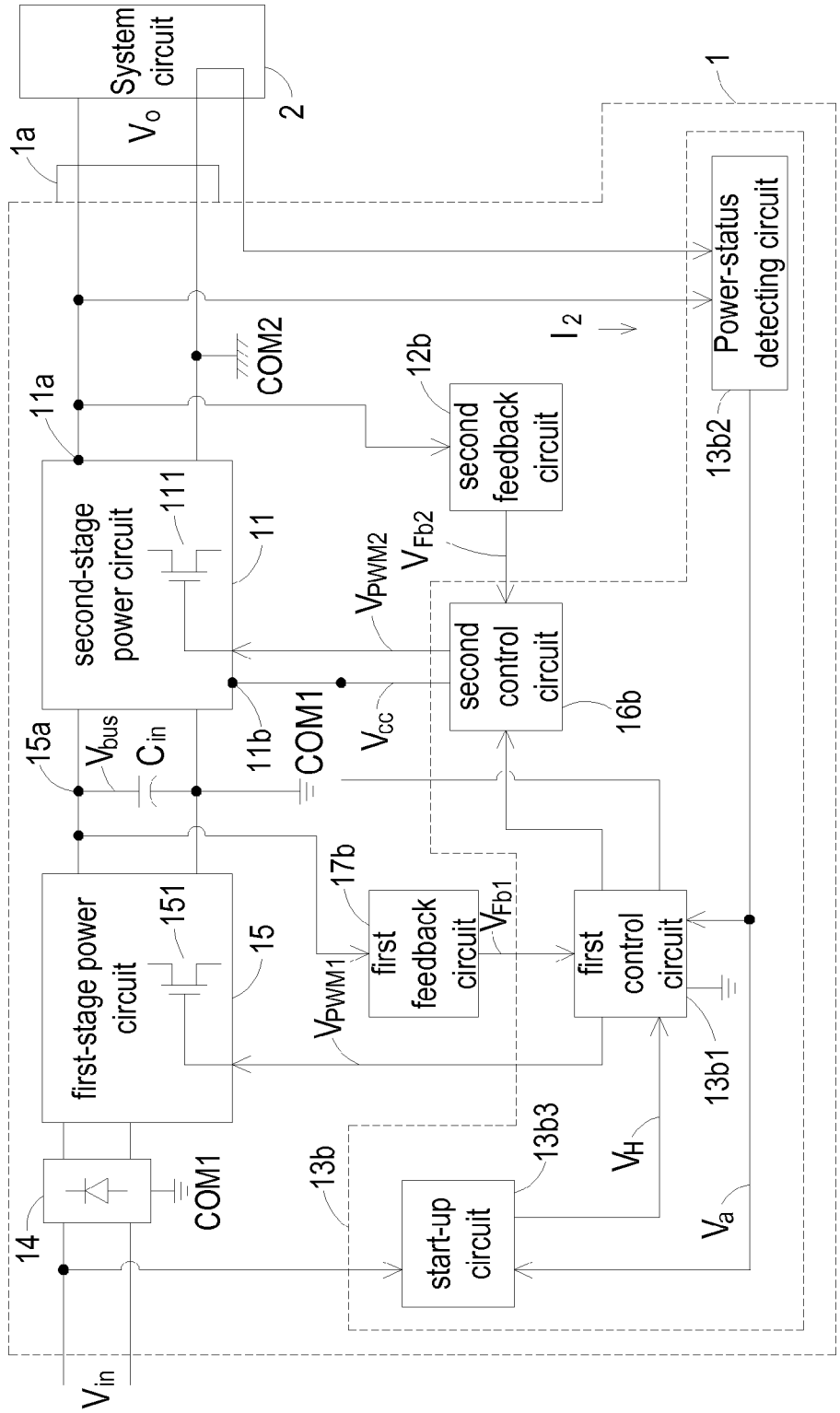
FIG. 5 is a schematic circuit diagram of a switching power conversion circuit according to a second embodiment of the present disclosure.

FIG. 5 is a schematic circuit diagram of a switching power conversion circuit according to a second embodiment of the present disclosure. Please refer to FIG. 5 and FIG. 1. The switching power conversion circuit 1 shown in FIG. 5 has similar topology as the switching power conversion circuit 1 shown in FIG. 1. In comparison with FIG. 1, the controlling unit 13b of the switching power conversion circuit 1 of FIG. 5 is distinguished. In addition, the switching power conversion circuit 1 of FIG. 5 is connected with the system circuit 2 via a power connector 1a.

In this embodiment, the controlling unit 13b comprises a first control circuit 13b1, a second control circuit 16b, a start-up circuit 13b3 and a power-status detecting circuit 13b2. The power-status detecting circuit 13b2 is connected to the power output terminal 11a of the second-stage power circuit 11, the start-up circuit 13b3, the power connector 1a and the first control circuit 13b1. The power-status detecting circuit 13b2 is used for discriminating whether electrical energy of the switching power conversion circuit 1 needs to be transmitted to the system circuit 2. Namely, the power-status detecting circuit 13b2 is used for discriminating whether power connector 1a is connected with the system circuit 2 and whether electrical energy of the switching power conversion circuit 1 needs to be transmitted to the system circuit 2, thereby generating a corresponding power-status detecting signal $V_a$. According to the power-status detecting signal $V_a$, the energy of the input voltage $V_{in}$ is converted into the start-up voltage $V_H$ by the start-up circuit 13b3 and transmitted to the first control circuit 13b1 for enabling the first control circuit 13b1. The first control circuit 13b1 issues a corresponding control signal to the second control circuit 16b for driving the second control circuit 16b. According to the power-status detecting signal $V_a$, the first control circuit 13b1 is discontinuously operated or stops operating when the electrical energy of the switching power conversion circuit 1 needn't to be transmitted to the system circuit 2 so as to control the second control circuit 16b to be disabled or discontinuously enabled.

In this embodiment, when the power connector 1a is connected with the system circuit 2, the power-status detecting signal $V_a$ issued from the power-status detecting circuit 13b2 is in the zero-level status or low-level status (i.e. an on status). On the contrary, when the power connector 1a is disconnected from the system circuit 2, the power-status detecting signal Va is in the high-level status (i.e. an off status).

When the power connector 1a is connected with the system circuit 2 by the user, the power-status detecting signal $V_a$ is in the low-level status (i.e. an on status). The start-up circuit 13b3 is enabled according to the power-status detecting signal $V_a$, and the energy of the input voltage $V_{in}$ is converted into the start-up voltage $V_H$ having a non-zero voltage value (i.e. higher than zero voltage value) by the start-up circuit 13b3 and transmitted to the first control circuit 13b1. The energy of the start-up voltage $V_H$ is transmitted to the first auxiliary power output terminal 11b of the second-stage power circuit 11 by the first control circuit 13b1, so that the first auxiliary voltage $V_{cc}$ at the first auxiliary power output terminal 11b of the second-stage power circuit 11 is boosted to a voltage value higher than the first operating voltage value of the first control circuit 13b1. As such, the first control circuit 13b1 is enabled. According to the first feedback signal $V_{fb1}$, the first control circuit 13b1 is continuously operated to issue the first pulse width modulation control signal $V_{PWM1}$ to the first switching circuit 151. According to the first pulse width modulation control signal $V_{PWM1}$, the first switching circuit 151 is conducted or shut off under control of the first control circuit 13b1. As such, the energy of the input voltage $V_{in}$ is converted into the bus voltage $V_{bus}$, and the bus voltage $V_{bus}$, is maintained at a rated level. Meanwhile, the first control circuit 13b1 issues a control signal to the second control circuit 16b for driving the second control circuit 16b. According to the second feedback signal $V_{fb2}$, the second control circuit 16b generates a second pulse width modulation control signal $V_{PWM2}$. According to the second pulse width modulation control signal $V_{PWM2}$, the second switching circuit 111 is conducted or shut off under control of the second control circuit 16b. As such, the energy of the bus voltage $V_{bus}$, is converted into the output voltage $V_o$ and the first auxiliary voltage $V_{cc}$, and the output voltage $V_o$ and the first auxiliary voltage $V_{cc}$ are maintained at the rated values.

When the power connector 1a is disconnected from the system circuit 2, the power-status detecting signal $V_a$ is in the high-level status (i.e. an off status). Meanwhile, according to the power-status detecting signal $V_a$, the start-up circuit 13b3 is disabled or discontinuously enabled to convert the energy of the input voltage $V_{in}$ into the start-up voltage $V_H$. In addition, according to the power-status detecting signal $V_a$, the first control circuit 13b1 is disabled or discontinuously enabled so as to control the second control circuit 16b to be disabled or discontinuously enabled. As such, the voltage value of the output voltage $V_o$ outputted from the second-stage power circuit 11 is temporarily lower than the rated value or equal to zero, and the switching power conversion circuit 1 discontinuously provides or stops providing electrical energy to the system circuit 2.

Figure 6:
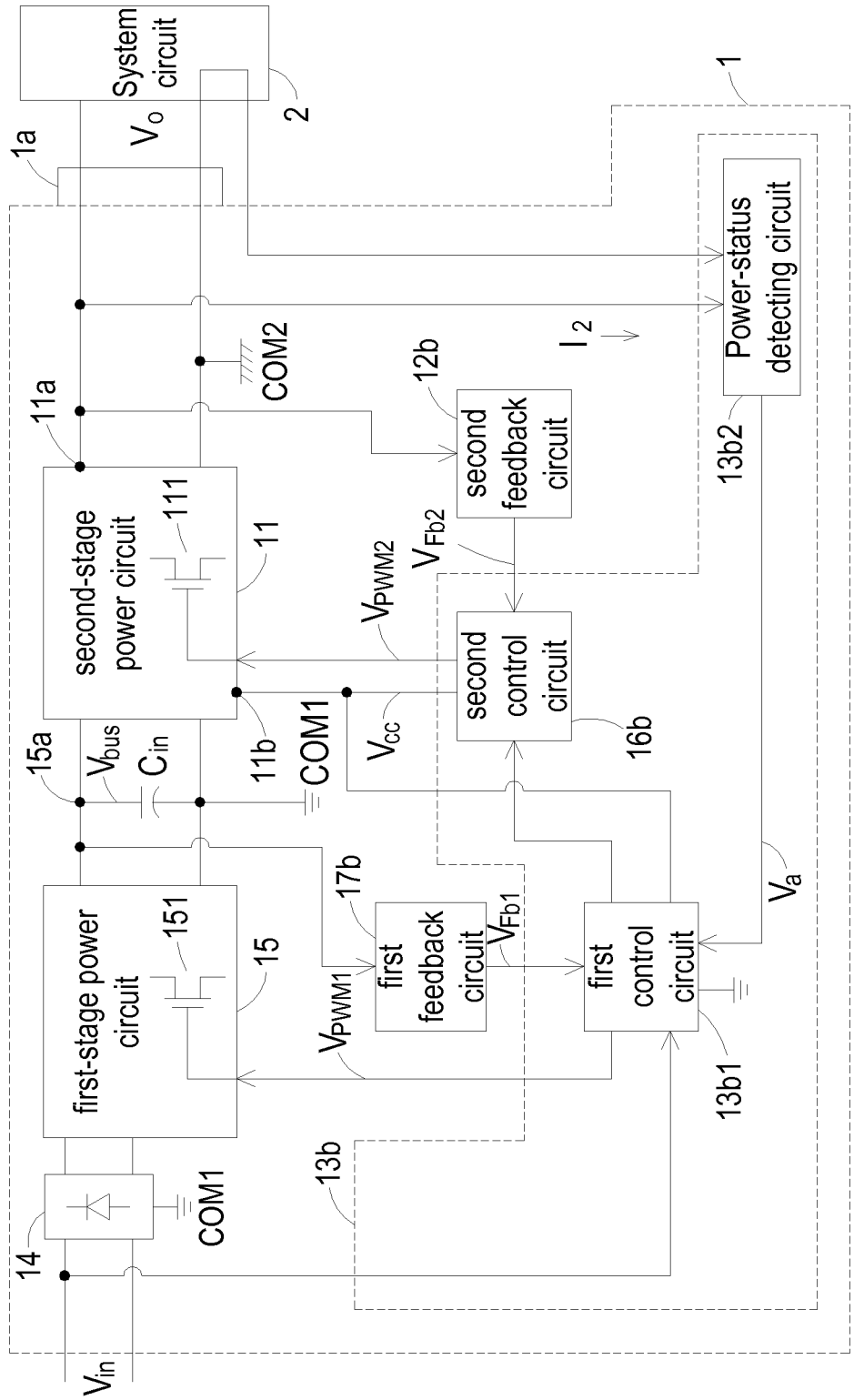
FIG. 6 is a schematic circuit diagram showing an alternative embodiment of the switching power conversion circuit of FIG. 5.

In an alternative embodiment, the start-up circuit 13b3 of the controlling unit 13b as shown in FIG. 5 can be omitted from the switching power conversion circuit 1. For example, the start-up circuit 13b3 can be omitted by combining the start-up circuit 13b3 into the first control circuit 13b1, so that another switching power conversion circuit 1 is provided and shown in FIG. 6. As shown in FIG. 6, the first control circuit 13b1 is connected to the control terminal of the first switching circuit 151, the output terminal of the first feedback circuit 17b, the first auxiliary power output terminal 11b of the second-stage power circuit 11, the power-status detecting circuit 13b2 and the second control circuit 16b, and further connected to the input terminal of the input rectifier circuit 14.

When the power connector 1a is connected with the system circuit 2 by the user, the power-status detecting signal $V_a$ outputted from the power-status detecting circuit 13b2 is in the low-level status (i.e. an on status). Meanwhile, the energy of the input voltage $V_{in}$ is transmitted to the first auxiliary power output terminal 11b of the second-stage power circuit 11 by the first control circuit 13b1 according to the on status of the power-status detecting signal $V_a$, so that the first auxiliary voltage $V_{cc}$ at the first auxiliary power output terminal 11b of the second-stage power circuit 11 is boosted to a voltage value higher than the first operating voltage value of the first control circuit 13b1. The first control circuit 13b1 is enabled to control the operations of the first-stage power circuit 15. According to the first feedback signal $V_{fb1}$, the first control circuit 13b1 is continuously operated to issue the first pulse width modulation control signal $V_{PWM1}$ to the first switching circuit 151. According to the first pulse width modulation control signal $V_{PWM1}$, the first switching circuit 151 is conducted or shut off under control of the first control circuit 13b1. As such, the energy of the input voltage $V_{in}$ is converted into the bus voltage $V_{bus}$, and the bus voltage $V_{bus}$ is maintained at a rated level. Meanwhile, the first control circuit 13b1 issues a control signal to the second control circuit 16b for driving the second control circuit 16b. According to the second feedback signal $V_{fb2}$, the second control circuit 16b generates a second pulse width modulation control signal $V_{PWM2}$. According to the second pulse width modulation control signal $V_{PWM2}$, the second switching circuit 111 is conducted or shut off under control of the second control circuit 16b. As such, the energy of the bus voltage $V_{bus}$ is converted into the output voltage $V_o$ and the first auxiliary voltage $V_{cc}$, furthermore, the output voltage $V_o$ and the first auxiliary voltage $V_{cc}$ outputted from the second-stage power circuit 11 are maintained at the rated values.

When the power connector 1a is disconnected from the system circuit 2, the power-status detecting signal $V_a$ issued from the power-status detecting circuit 13b2 is in the high-level status (i.e. an off status). Meanwhile, according to the power-status detecting signal $V_a$, the first control circuit 13b1 is disabled or discontinuously enabled, and generates a control signal for driving the second control circuit 16b to be disabled or discontinuously enabled. As such, the voltage values of the output voltage $V_o$ and the first auxiliary voltage $V_{cc}$ outputted from the second-stage power circuit 11 are temporarily lower than the rated value or equal to zero, and the switching power conversion circuit 1 discontinuously provides or stops providing electrical energy to the system circuit 2.

Figure 7:
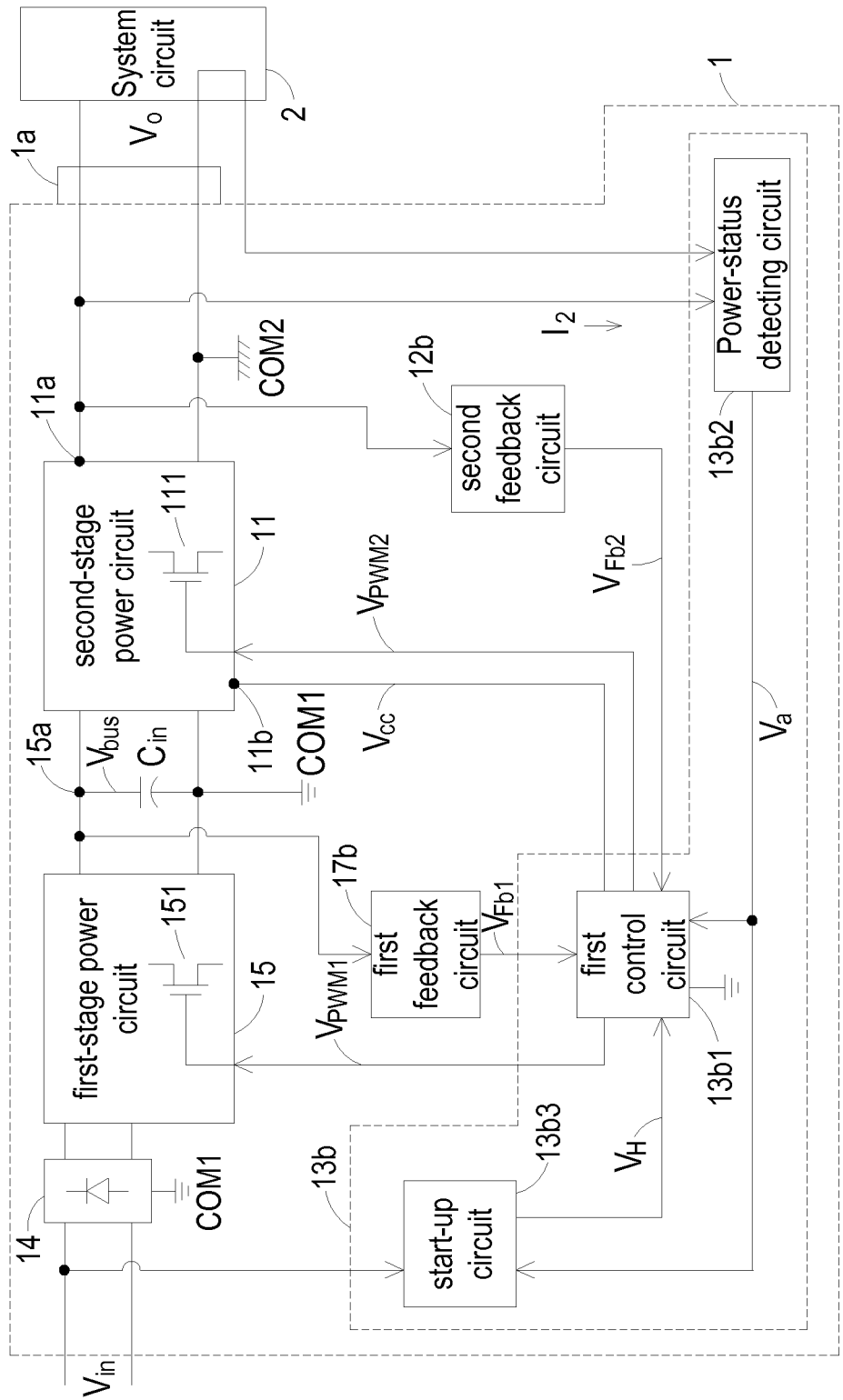
FIG. 7 is a schematic circuit diagram showing another alternative embodiment of the switching power conversion circuit of FIG. 5.

In an alternative embodiment, the second control circuit 16b as shown in FIG. 5 can be integrated into the first control circuit 13b1, so that another switching power conversion circuit 1 is provided and shown in FIG. 7. As shown in FIG. 7, the first control circuit 13b1 is connected to the control terminal of the first switching circuit 151, the output terminal of the first feedback circuit 17b, the first auxiliary power output terminal 11b of the second-stage power circuit 11, the power-status detecting circuit 13b2, the start-up circuit 13b3, and is further connected to the control terminal of the second switching circuit 111 and the output terminal of the second feedback circuit 12b. According to the first feedback signal $V_{fb1}$, the first control circuit 13b1 issues the first pulse width modulation control signal $V_{PWM1}$ to control the ON/OFF operations of the first switching circuit 151. As such, the energy of the input voltage $V_{in}$ is converted into the bus voltage $V_{bus}$. Furthermore, according to the second feedback signal $V_{fb2}$, the first control circuit 13b1 issues a second pulse width modulation control signal $V_{PWM2}$ to control the ON/OFF operations of the second switching circuit 111. As such, the energy of the bus voltage $V_{bus}$ is converted into the output voltage $V_o$ and the first auxiliary voltage $V_{cc}$.

When the power connector 1a is connected with the system circuit 2 by the user, the power-status detecting signal $V_a$ outputted from the power-status detecting circuit 13b2 is in the low-level status (i.e. an on status). Meanwhile, the start-up circuit 13b3 is enabled according to the power-status detecting signal $V_a$, and the energy of the input voltage $V_{in}$ is converted into the start-up voltage $V_H$ having a non-zero voltage value by the start-up circuit 13b3 and transmitted to the first control circuit 13b1. The energy of the start-up voltage $V_H$ is transmitted to the first auxiliary power output terminal 11b of the second-stage power circuit 11 by the first control circuit 13b1, so that the first auxiliary voltage $V_{cc}$ at the first auxiliary power output terminal 11b of the second-stage power circuit 11 is boosted to a voltage value higher than the first operating voltage value of the first control circuit 13b1. As such, the first control circuit 13b1 is enabled. According to the first feedback signal $V_{fb1}$, the first control circuit 13b1 is continuously operated to issue the first pulse width modulation control signal $V_{PWM1}$ to the first switching circuit 151. According to the first pulse width modulation control signal $V_{PWM1}$, the first switching circuit 151 is conducted or shut off under control of the first control circuit 13b1. As such, the energy of the input voltage $V_{in}$ is converted into the bus voltage $V_{bus}$, and the bus voltage $V_{bus}$ is maintained at a rated level. According to the second feedback signal $V_{fb2}$, the first control circuit 13b1 generates a second pulse width modulation control signal $V_{PWM2}$. According to the second pulse width modulation control signal $V_{PWM2}$, the second switching circuit 111 is conducted or shut off under control of the first control circuit 13b1. As such, the energy of the bus voltage $V_{bus}$ is converted into the output voltage $V_o$ and the first auxiliary voltage $V_{cc}$, and the output voltage $V_o$ and the first auxiliary voltage $V_{cc}$ are maintained at the rated values.

When the power connector 1a is disconnected from the system circuit 2, the power-status detecting signal $V_a$ issued from the power-status detecting circuit 13b2 is in the high-level status (i.e. an off status). Meanwhile, according to the power-status detecting signal $V_a$, the start-up circuit 13b3 is disabled or discontinuously enabled to convert the energy of the input voltage $V_{in}$ into the start-up voltage $V_H$. In addition, according to the power-status detecting signal $V_a$, the first control circuit 13b1 is disabled or discontinuously enabled. As such, the voltage values of the output voltage $V_o$ and the first auxiliary voltage $V_{cc}$ outputted from the second-stage power circuit 11 are temporarily lower than the rated value or equal to zero, and the switching power conversion circuit 1 discontinuously provides or stops providing electrical energy to the system circuit 2.

Figure 8:
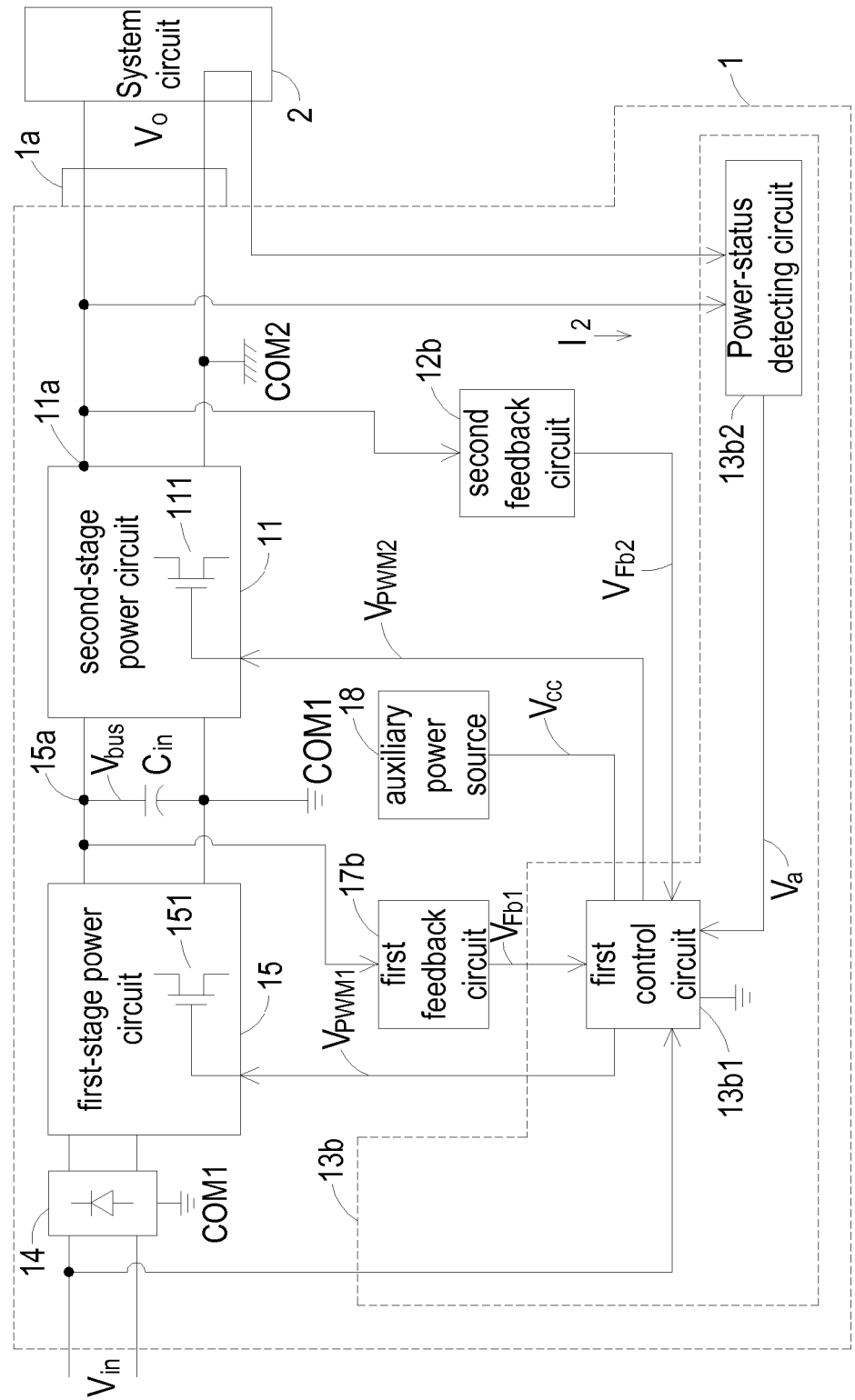
FIG. 8 is a schematic circuit diagram showing an alternative embodiment of the switching power conversion circuit of FIG. 7.

In some embodiments, the start-up circuit 13b3 of the controlling unit 13b as shown in FIG. 7 can be omitted from the switching power conversion circuit 1. For example, the start-up circuit 13b3 can be omitted by combining the start-up circuit 13b3 into the first control circuit 13b1, so that another switching power conversion circuit 1 is provided and shown in FIG. 8. As shown in FIG. 8, the first control circuit 13b1 is connected to the control terminal of the first switching circuit 151, the output terminal of the first feedback circuit 17b, the power-status detecting circuit 13b2, the control terminal of the second switching circuit 111 and the output terminal of the second feedback circuit 12b, and is further connected to the input terminal of the input rectifier circuit 14. In this embodiment, the second-stage power circuit 11 as shown in FIG. 8 fails to output the first auxiliary voltage $V_{cc}$, which can be outputted from the second-stage power circuit 11 as shown in FIGS. 5, 6 and 7. Furthermore, the switching power conversion circuit 1 further comprises an auxiliary power source 18. The auxiliary power source 18 is connected to the first control circuit 13b1 for supplying the first auxiliary voltage $V_{cc}$ to the first control circuit 13b1 continuously, thereby allowing the first control circuit 13b1 to operate. In an embodiment, the auxiliary power source 18 can be an additional power source for supplying the first auxiliary voltage $V_{cc}$ or a power source supplying the first auxiliary voltage $V_{cc}$ by drawing the energy from the bus voltage $V_{bus}$.

When the power connector 1a is connected with the system circuit 2 by the user, the power-status detecting signal $V_a$ is in the low-level status (i.e. an on status). Meanwhile, according to the low-level status of the power-status detecting signal $V_a$, the first control circuit 13b1 is operated by receiving the first auxiliary voltage $V_{cc}$ supplied from the auxiliary power source 18. According to the first feedback signal $V_{fb1}$, the first control circuit 13b1 is continuously operated to issue the first pulse width modulation control signal $V_{PWM1}$ to the first switching circuit 151. According to the first pulse width modulation control signal $V_{PWM1}$, the first switching circuit 151 is conducted or shut off under control of the first control circuit 13b1. As such, the energy of the input voltage $V_{in}$ is converted into the bus voltage $V_{bus}$, and the bus voltage $V_{bus}$ is maintained at a rated level. Meanwhile, according to the second feedback signal $V_{fb2}$, the first control circuit 13b1 generates a second pulse width modulation control signal $V_{PWM2}$. According to the second pulse width modulation control signal $V_{PWM2}$, the second switching circuit 111 is conducted or shut off under control of the first control circuit 13b1. As such, the energy of the bus voltage $V_{bus}$ is converted into the output voltage $V_o$, and the output voltage $V_o$ is maintained at the rated value.

When the power connector 1a is disconnected from the system circuit 2, the power-status detecting signal $V_a$ is in the high-level status (i.e. an off status). Meanwhile, according to the power-status detecting signal $V_a$, the first control circuit 13b1 is disabled or discontinuously enabled. As such, the voltage value of the output voltage $V_o$ outputted from the second-stage power circuit 11 is temporarily lower than the rated value or equal to zero, and the switching power conversion circuit 1 discontinuously provides or stops providing electrical energy to the system circuit 2.

In the switching power conversion circuit 1 shown in FIG. 8, the switching power conversion circuit 1 employs the auxiliary power source 18 to continuously supply the first auxiliary voltage $V_{cc}$ to the first control circuit 13b1, and the first control circuit 13b1 can determine whether to receive the energy of the first auxiliary voltage $V_{cc}$ according to the status of the power-status detecting signal $V_a$. In the switching power conversion circuit 1 shown in FIGS. 5, 6 and 7, the first control circuit 13b1 is operated when the voltage value of the first auxiliary voltage $V_{cc}$ at the first auxiliary power output terminal 11b of the second-stage power circuit 11 is equal to or higher than the first operating voltage value of the first control circuit 13b1. Certainly, the above-mentioned technologies for operating the first circuit 13b1 can be exchanged with each other, and it is not intended to be exhaustive or to be limited to the embodiments as disclosed in FIGS. 5, 6, 7 and 8.

Figure 9:
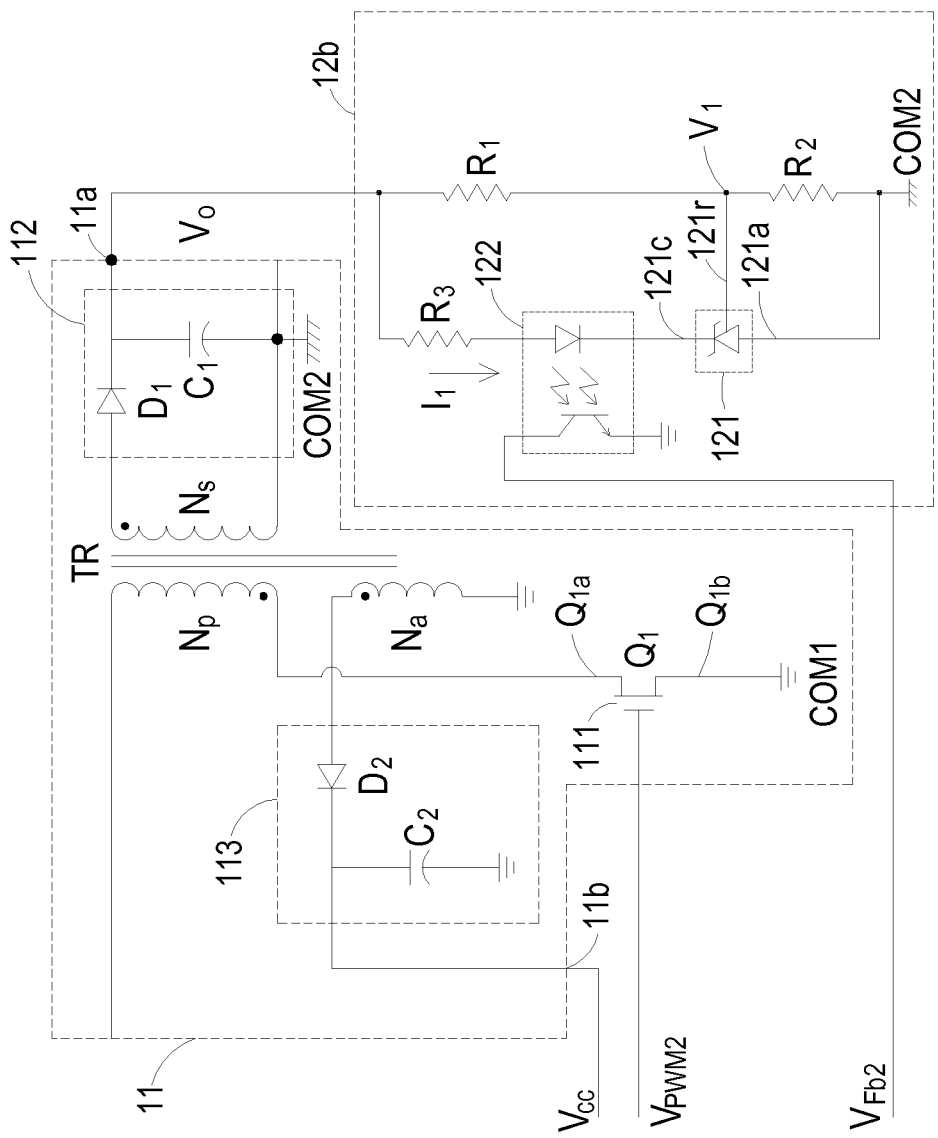
FIG. 9 is a schematic detailed circuit diagram illustrating the second-stage power circuit and the second feedback circuit of the switching power conversion circuit shown in FIGS. 1-8.

It is to be noted that various circuit topologies of the first-stage power circuit 15, the second-stage power circuit 11, the first feedback circuit 17b, the second feedback circuit 12b and the power-status detecting circuit 13b2 can be used in the switching power conversion circuit 1. The detailed circuit topologies will be demonstrated hereinafter. FIG. 9 is a schematic detailed circuit diagram illustrating the second-stage power circuit and the second feedback circuit of the switching power conversion circuit shown in FIGS. 1-8. As shown in FIG. 9, the second-stage power circuit 11 comprises a second switching circuit 111, a first rectifier and filter circuit 112, a second rectifier and filter circuit 113 and a transformer $T_r$. The transformer $T_r$ comprises a primary winding coil $N_p$, a secondary winding coil $N_s$ and an auxiliary winding coil $N_a$. The second switching circuit 111 comprises a first switch element $Q_1$. A first end of the primary winding coil $N_p$ of the transformer $T_r$ is connected to a first terminal $Q_{1a}$ of the first switch element $Q_1$. A second terminal $Q_{1b}$ of the first switch element $Q_1$ is connected to a first common terminal $COM_1$. A control terminal of the first switch element $Q_1$ is connected to the controlling unit 13b. According to the second pulse width modulation control signal $V_{PWM2}$ generated by the controlling unit 13b (i.e. the second control circuit 16b shown in FIGS. 1, 2, 5 and 6, or the first control circuit 13b1 shown in FIGS. 3, 4, 7 and 8), the first switch element $Q_1$ is conducted or shut off. As such, the electrical energy of the input voltage $V_{in}$ (i.e. bus voltage $V_{bus}$) is transmitted to the secondary winding coil $N_s$ and an auxiliary winding coil $N_a$ of the transformer $T_r$ through the primary winding coil $N_p$, and then respectively rectified and filtered by the first rectifier and filter circuit 112 and the second rectifier and filter circuit 113, thereby generating the output voltage $V_o$ and the first auxiliary voltage $V_{cc}$.

The first rectifier and filter circuit 112 is interconnected between the secondary winding coil $N_s$ of transformer $T_r$ and the system circuit 2. The first rectifier and filter circuit 112 comprises a first diode $D_1$ and a first capacitor $C_1$. The anode of the first diode $D_1$ is connected to the secondary winding coil $N_s$ of transformer $T_r$. The cathode of the first diode $D_1$ is connected to the power output terminal of the second-stage power circuit 11. The first capacitor $C_1$ is interconnected between the cathode of the first diode $D_1$ and a second common terminal $COM_2$.

The second rectifier and filter circuit 113 is interconnected between the auxiliary winding coil $N_a$ of the transformer $T_r$ and the first auxiliary power output terminal 11b. The second rectifier and filter circuit 113 comprises a second diode $D_2$ and a second capacitor $C_2$. The anode of the second diode $D_2$ is connected to the auxiliary winding coil $N_a$ of the transformer $T_r$. The cathode of the second diode $D_2$ is connected to the first auxiliary power output terminal 11b. The second capacitor $C_2$ is interconnected between the first auxiliary power output terminal 11b of the second-stage power circuit 11 and a first common terminal COW In this embodiment, the second feedback circuit 12b comprises a first resistor $R_1$, a second resistor $R_2$, a third resistor $R_3$, a three-terminal adjustable voltage regulator 121 and a first isolating element 122. One end of the first resistor $R_1$ is connected to the power output terminal 11a of the second-stage power circuit 11. The second resistor $R_2$ is interconnected between the other end of the first resistor $R_1$ and the second common terminal $COM_2$. The first resistor $R_1$ and the second resistor $R_2$ are serially connected with each other, thereby collectively defining a first voltage-division circuit. The output voltage $V_o$ is subject to voltage division by the first voltage-division circuit at a first reference terminal 121r of the three-terminal adjustable voltage regulator 121, thereby generating a first divided voltage $V_1$ at a first connecting node between the first resistor $R_1$ and the second resistor $R_2$.

An example of the first isolating element 122 includes but is not limited to a photoelectric coupling isolator. The output side of the first isolating element 122 is connected to the output terminal of the second feedback circuit 12b. According to the magnitude of a first current $I_1$ flowing into the input side of the first isolating element 122, the first isolating element 122 generates the corresponding second feedback signal $V_{fb2}$. The input side of the first isolating element 122 and the third resistor $R_3$ are serially interconnected between the cathode 121c of the three-terminal adjustable voltage regulator 121 and the power output terminal 11a of the second-stage power circuit 11. The third resistor $R_3$ is used for limiting the first current $I_1$ flowing into the cathode 121c of the three-terminal adjustable voltage regulator 121 or the input side of the first isolating element 122. In other words, the serial connection between the third resistor $R_3$ and the input side of the first isolating element 122 could achieve the purpose of limiting the magnitude of the first current $I_1$. In some embodiments, the locations of the third resistor $R_3$ and the input side of the first isolating element 122 are exchanged (not shown), which are reversed with respective to the locations shown in FIG. 9.

An example of the three-terminal adjustable voltage regulator 121 is a LM317 IC (National Semiconductor), but it is not limited thereto. The anode 121a of the three-terminal adjustable voltage regulator 121 is connected to the second common terminal $COM_2$. According to the divided voltage $V_1$ and a first reference voltage value (e.g. 1.25V) of the three-terminal adjustable voltage regulator 121, the magnitude of the first current $I_1$ is automatically adjusted by the three-terminal adjustable voltage regulator 121. As such, the output side of the first isolating element 122 generates the second feedback signal $V_{fb2}$ according to the output voltage $V_o$.

Figure 10:
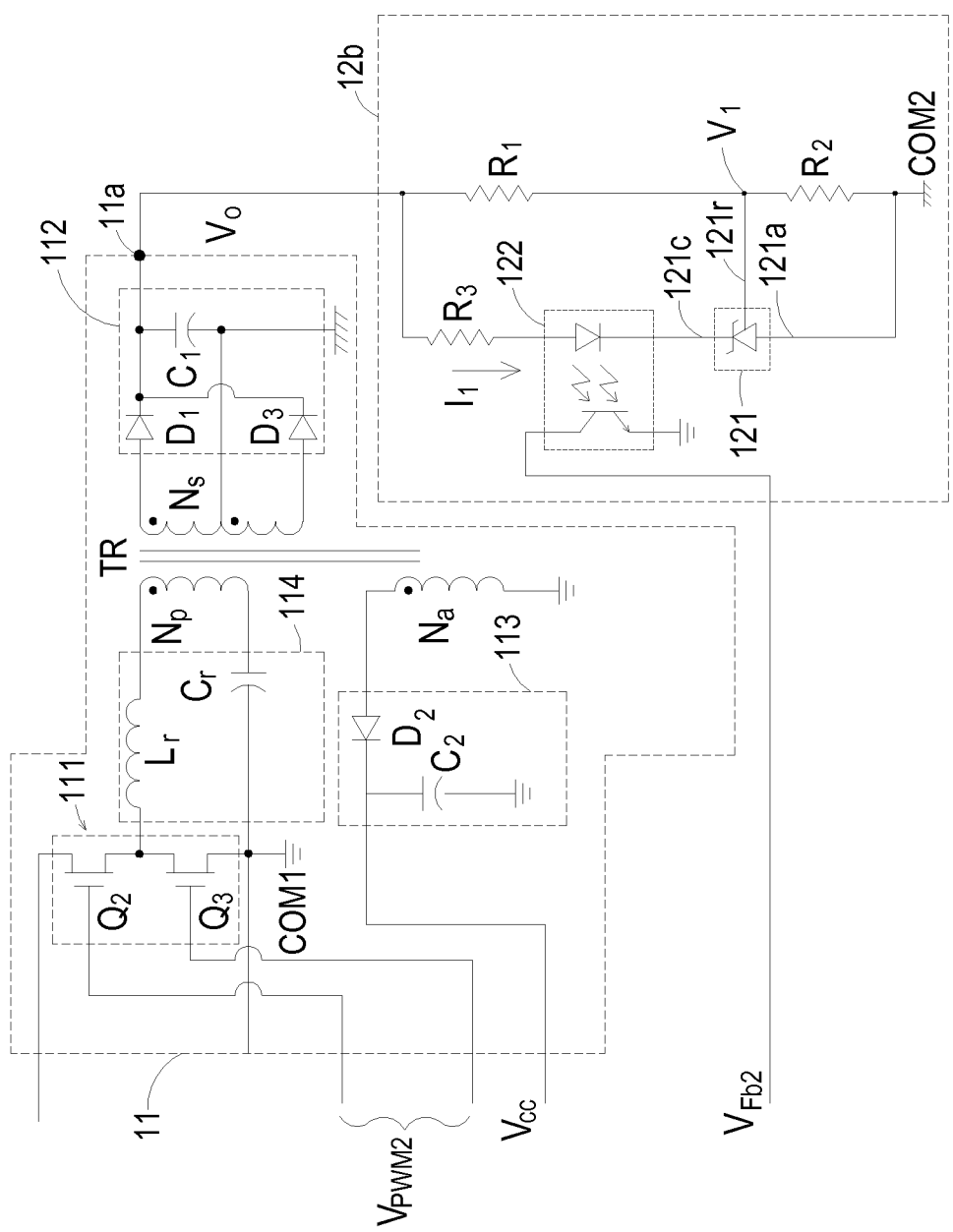
FIG. 10 is a schematic circuit diagram showing an alternative embodiment of the second-stage power circuit of FIG. 9.

In an alternative embodiment, as shown in FIG. 10, the second-stage power circuit 11 is implemented in resonant circuit topology and comprises a second switching circuit 111, a first rectifier and filter circuit 112, a second rectifier and filter circuit 113, a resonant circuit 114 and a transformer $T_r$. The transformer $T_r$ comprises a primary winding coil $N_p$, a secondary winding coil $N_s$ and an auxiliary winding coil $N_a$. The secondary winding coil $N_s$ is a center-tapped winding coil. The second switching circuit 111 comprises a second switch element $Q_2$ and a third switch element $Q_3$. The second switch element $Q_2$ and the third switch element $Q_3$ are serially connected between the power input terminal of the second-stage power circuit 11 and a first common terminal $COM_1$.

The control terminals of the second switch element $Q_2$ and the third switch element $Q_3$ are used to receive the second pulse width modulation control signal $V_{PWM2}$, respectively, so that the second switch element $Q_2$ and the third switch element $Q_3$ are conducted or shut off according to the second pulse width modulation control signal $V_{PWM2}$.

In this embodiment, the resonant circuit 14 is connected between the second switching circuit 111 and the transformer $T_r$ and includes but not limited to a resonant inductor $L_r$ and a resonant capacitor $C_r$. A first end of the resonant inductor Lr is connected between the second switch element $Q_2$ and the third switch element $Q_3$. A second end of the resonant inductor Lr is connected to one end of the primary winding coil $N_p$. A first end of the resonant capacitor Cr is connected to a first common terminal $COM_1$. A second end of the resonant capacitor Cr is connected to the other end of the primary winding coil $N_p$. Alternatively, the resonant circuit 14 includes a resonant inductor $L_r$, a resonant capacitor $C_r$, and a primary winding coil $N_p$ of the transformer $T_r$. According to the second pulse width modulation control signal $V_{PWM2}$ generated by the controlling unit 13b (i.e. the second control circuit 16b shown in FIGS. 1, 2, 5 and 6, or the first control circuit 13b1 shown in FIGS. 3, 4, 7 and 8), the second switch element $Q_2$ and the third switch element $Q_3$ are conducted or shut off, respectively. In addition, the resonant circuit 114 can perform a resonant operation. As such, the electrical energy of the input voltage $V_{in}$ (i.e. bus voltage $V_{bus}$) is transmitted to the secondary winding coil $N_s$ and an auxiliary winding coil $N_a$ of the transformer $T_r$ through the primary winding coil $N_p$, and then respectively rectified and filtered by the first rectifier and filter circuit 112 and the second rectifier and filter circuit 113, thereby generating the output voltage $V_o$ and the first auxiliary voltage $V_{cc}$.

The first rectifier and filter circuit 112 is interconnected between the secondary winding coil $N_s$ of transformer $T_r$ and the system circuit 2. The first rectifier and filter circuit 112 comprises a first diode $D_1$, a third diode $D_3$ and a first capacitor $C_1$. The anode of the first diode $D_1$ is connected to one end of the secondary winding coil $N_s$ of transformer $T_r$. The cathode of the first diode $D_1$ is connected to the power output terminal 11a of the second-stage power circuit 11. The anode of the third diode $D_3$ is connected to the other end of the secondary winding coil $N_s$ of transformer $T_r$. The cathode of the third diode $D_3$ is connected to the cathode of the first diode $D_1$ and the power output terminal 11a of the second-stage power circuit 11. One end of the first capacitor $C_1$ is connected to the cathode of the first diode $D_1$, the cathode of the third diode $D_3$ and the power output terminal 11a of the second-stage power circuit 11. The other end of the first capacitor $C_1$ is connected to a center-tapped end of the secondary winding coil $N_s$ and a second common terminal $COM_2$.

In this embodiment, the second rectifier and filter circuit 113 has similar topology as the second rectifier and filter circuit shown in FIG. 9. The same element shown in FIG. 9 and FIG. 10 is labeled with similar term and reference numeral, and the circuit topology of the second rectifier and filter circuit 113 will not be illustrated redundantly. It is to be noted that various circuit topologies of the second-stage power circuit can be employed in the switching power conversion circuit 1. The above descriptions of the two embodiments are presented herein for purpose of illustration and description only. It is not intended to be exhaustive or to be limited to the precise form disclosed.

Figure 11B:
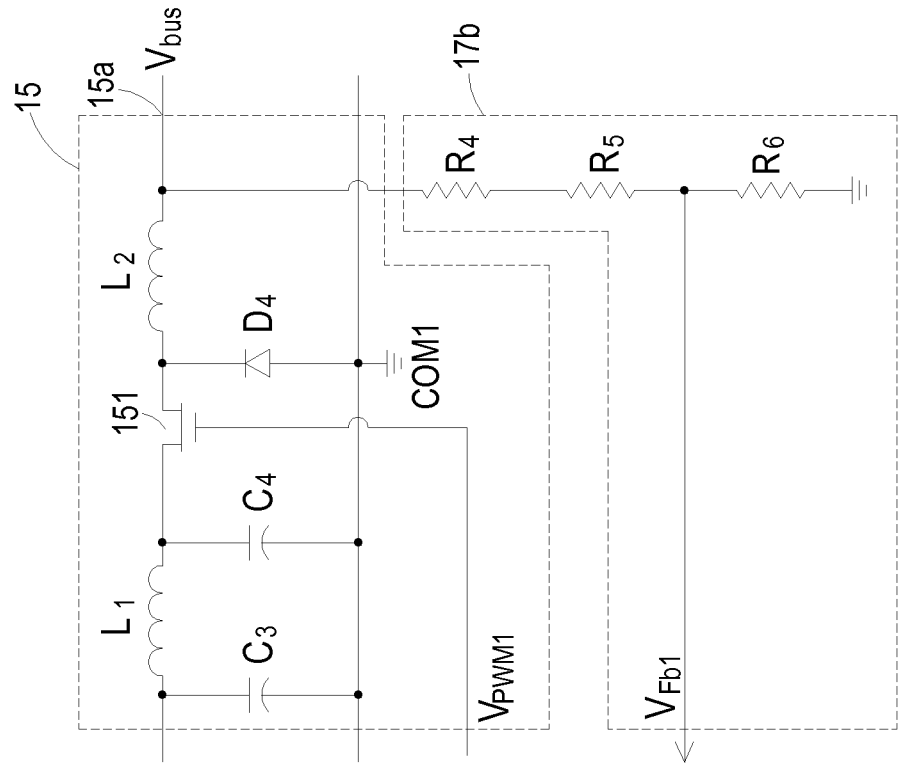
FIG. 11B is a schematic circuit diagram showing an alternative embodiment of the first-stage power circuit of FIG. 11A.
Figure 11A:
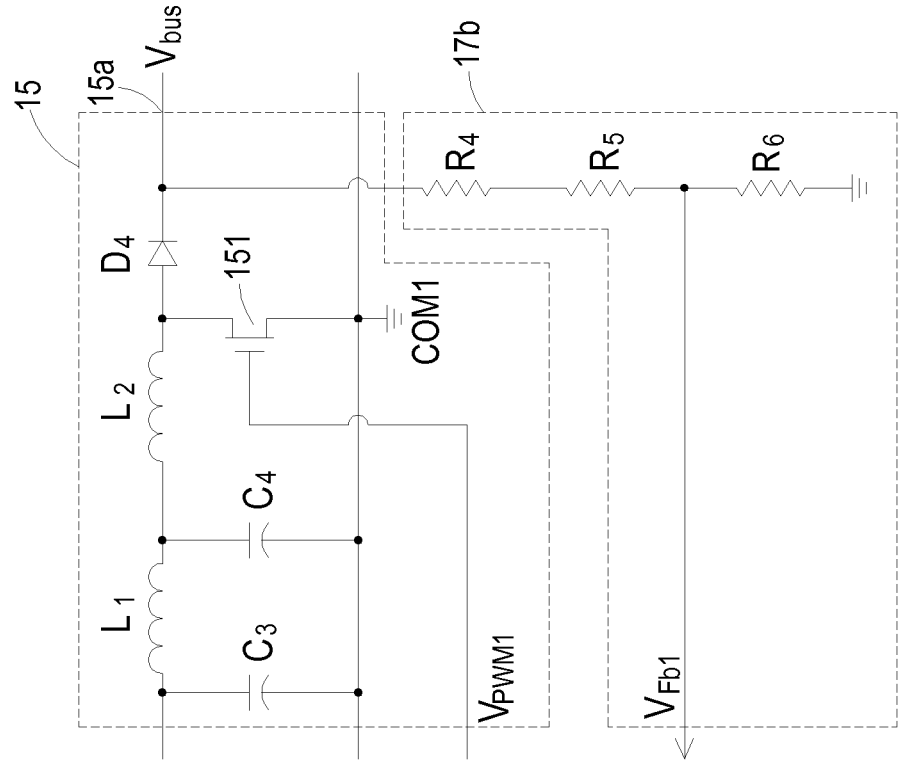
FIG. 11A is a schematic detailed circuit diagram illustrating the first-stage power circuit and the first feedback circuit of the switching power conversion circuit shown in FIGS. 1-8.

FIG. 11A is a schematic detailed circuit diagram illustrating the first-stage power circuit and the first feedback circuit of the switching power conversion circuit shown in FIGS. 1-8. As shown in FIG. 11A, the first-stage power circuit 15 comprises a first switching circuit 151, a third capacitor $C_3$, a fourth capacitor $C_4$, a first inductor $L_1$, a second inductor $L_2$ and a fourth diode $D_4$. One end of the third capacitor $C_3$ is connected to the power input terminal of the first-stage power circuit 15. The other end of the third capacitor $C_3$ is connected to the first common terminal $COM_1$. One end of the first inductor $L_1$ is connected to one end of the third capacitor $C_3$. One end of the fourth capacitor $C_4$ is connected to the other end of the first inductor $L_1$, and the other end of the fourth capacitor $C_4$ is connected to the first common terminal $COM_1$. In this embodiment, a filter circuit is composed of the third capacitor $C_3$, the fourth capacitor $C_4$ and the first inductor $L_1$. One end of the second inductor $L_2$ is connected to the other end of the first inductor $L_1$ and one end of the fourth capacitor $C_4$. The other end of the second inductor $L_2$ is connected to one terminal of the first switching circuit 151 and the anode of the fourth diode $D_4$. The cathode of the fourth diode $D_4$ is connected to the power output terminal 15a of the first-stage power circuit 15. The other end of the first switching circuit 151 is connected to the first common terminal $COM_1$. The first switching circuit 151 can be a switch device.

The first feedback circuit 17b comprises a fourth resistor $R_4$, a fifth resistor $R_5$ and a sixth resistor $R_6$. One end of the fourth resistor $R_4$ is connected to the power output terminal 15a of the first-stage power circuit 15. The other end of the fourth resistor $R_4$ is connected to one end of the fifth resistor $R_5$. The other end of the fifth resistor $R_5$ is connected to one end of the sixth resistor $R_6$ and an output terminal of the first feedback circuit 17b. The other end of the sixth resistor $R_6$ is connected to the first common terminal $COM_1$. The fourth resistor $R_4$, the fifth resistor $R_5$ and the sixth resistor $R_6$ are serially connected with each other, thereby collectively defining a second voltage-division circuit. The bus voltage $V_{bus}$ is subject to voltage division by the second voltage-division circuit, thereby generating the first feedback signal $V_{fb1}$ between the fifth resistor $R_5$ and the sixth resistor $R_6$ (i.e. at the output terminal of the first feedback circuit 17b).

Alternatively, the connection relationships of the second inductor $L_2$, the first switching circuit 151 and the fourth diode $D_4$ are not limited to the that shown in FIG. 11A. In some embodiments, as shown in FIG. 11B, one end of the first switching circuit 151 is connected to the other end of the first inductor $L_1$. The other end of the first switching circuit 151 is connected to one end of the second inductor $L_2$. The other end of the second inductor $L_2$ is connected to the power output terminal 15a of the first-stage power circuit 15. The cathode of the fourth diode $D_4$ is connected between the other end of the first switching circuit 151 and one end of the second inductor $L_2$. The anode of the fourth diode $D_4$ is connected to the first common terminal $COM_1$. It is to be noted that various circuit topologies of the first-stage power circuit can be employed in the switching power conversion circuit 1. The above descriptions of the two embodiments are presented herein for purpose of illustration and description only. It is not intended to be exhaustive or to be limited to the precise form disclosed.

Figure 12:
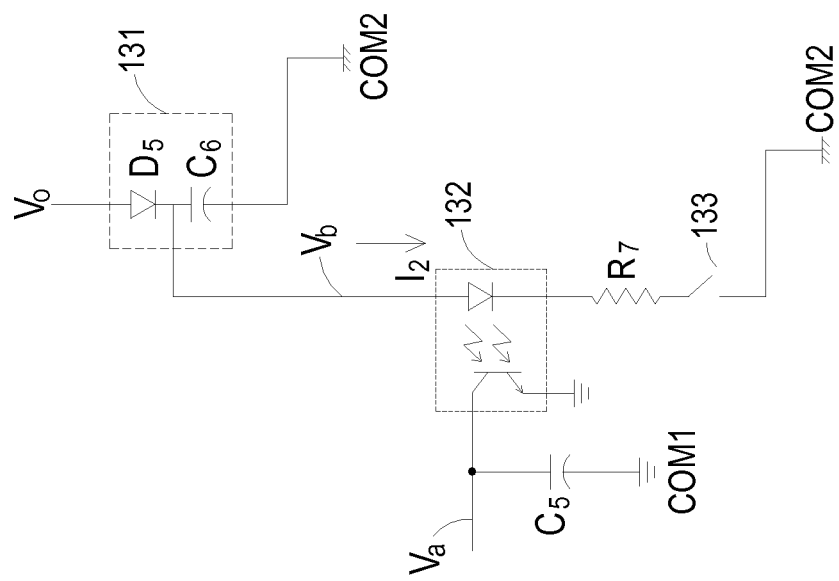
FIG. 12 is a schematic detailed circuit diagram illustrating the power-status detecting circuit of the switching power conversion circuit shown in FIGS. 5-8.

FIG. 12 is a schematic detailed circuit diagram illustrating the power-status detecting circuit of the switching power conversion circuit shown in FIGS. 5-8. As shown in FIG. 12, the power-status detecting circuit 13b2 comprises a holding circuit 131, a second isolating element 132, a linked switch element 133, a seventh resistor $R_7$ and a fifth capacitor $C_5$. The holding circuit 131 is connected to the power output terminal 11a of the second-stage power circuit 11, the second common terminal $COM_2$ and the input side of the second isolating element 132. By the holding circuit 131, the electrical energy of the first-stage power circuit 11 is converted into a second auxiliary voltage $V_b$, which is transmitted to the output side of the second isolating element 132. In addition, when the power connector 1a is disconnected from the system circuit 2 and the voltage value of the output voltage $V_o$ is reduced continuously to be lower than its rated value, the voltage value of the second auxiliary voltage $V_b$ can be maintained to be greater than a threshold value by the holding circuit 131. When the power connector 1a is connected with the system circuit 2 again, the holding circuit 131 can provide sufficient magnitude of the second auxiliary voltage $V_b$ to the input side of the second isolating element 132. As such, the power-status detecting signal $V_a$ is switched to the zero-level or low-level status (i.e. the on status).

In this embodiment, the holding circuit 131 comprises a fifth diode $D_5$ and a sixth capacitor $C_6$. A first end of the sixth capacitor $C_6$ is connected to the second common terminal $COM_2$. A second end of the sixth capacitor $C_6$ is connected to the cathode of the fifth diode $D_5$. The anode of the fifth diode $D_5$ is connected to the power output terminal 11a of the second-stage power circuit 11. The power output terminal of the holding circuit 131 is the cathode of the fifth diode $D_5$. The power output terminal of the holding circuit 131 is connected to the input side of the second isolating element 132.

An example of the second isolating element 132 includes but is not limited to a photoelectric coupling isolator. The output side of the second isolating element 132 is connected to the output terminal of the power-status detecting circuit 13b2. The input side of the second isolating element 132 is connected to the holding circuit 131 and one end of the seventh resistor $R_7$. The other end of the seventh resistor $R_7$ is serially connected to the input side of the second isolating element 132 for limiting the second current $I_2$ flowing into the input side of the second isolating element 132. Du to that the serial connection between the seventh resistor $R_7$ and the input side of the second isolating element 132 could achieve the purpose of limiting the magnitude of the second current $I_2$, the locations of the seventh resistor $R_7$ and the input side of the second isolating element 132 are exchanged (not shown), which are reversed with respective to the locations shown in FIG. 12. The other end of the linked switch element 133 is connected to the second common terminal $COM_2$. The linked switch element 133 is conducted or shut off according to the linking relation between the power connector 1a and the system circuit 2. The fifth capacitor $C_5$ is connected between the output terminal of the power-status detecting circuit 13b2 and the first common terminal $COM_1$.

In this embodiment, when the power connector 1a is connected with the system circuit 2 by the user, the linked switch element 133 is conducted, so that the magnitude of a second current $I_2$ flowing into the second isolating element 132 is not zero. Correspondingly, the power-status detecting signal $V_a$ is in the zero-level status or low-level status (i.e. an on status). Whereas, when the power connector 1a is disconnected from the system circuit 2 by the user, the linked switch element 133 is shut off, so that the magnitude of the second current $I_2$ is zero. Correspondingly, the power-status detecting signal $V_a$ is in the high-level status (i.e. an off status). Meanwhile, the voltage value of the second auxiliary voltage $V_b$ can be maintained to be equal to the threshold value by the holding circuit 131. When the power connector 1a is connected with the system circuit 2 again, the holding circuit 131 can provide sufficient magnitude of the second auxiliary voltage $V_b$ to the input side of the second isolating element 132. As such, the power-status detecting signal $V_a$ is switched to the zero-level or low-level status (i.e. the on status).

In the above embodiments, the first control circuit 13b1 and the second control circuit 16b are illustrated by referring to PWM controllers. Alternatively, the first control circuit 13b1 and the second control circuit 16b could be pulse frequency modulation (PFM) controllers or digital signal processors (DSPs). Each of the switch elements includes but is not limited to a bipolar junction transistor (BJT) or a metal oxide semiconductor field effect transistor (MOSFET).

From the above description, the switching power conversion circuit of the present disclosure has a two-stage power circuit topology and is capable of performing power factor correction. The switching power conversion circuit of the present disclosure could meet the power-saving requirement. In a case that the electrical energy of the switching power conversion circuit 1 needs not to be provided to the system circuit (for example the load and the electronic device fails to be operated), the control circuit is disabled according to the feedback signal issued by the feedback circuit and the start-up voltage issued by the start-up circuit of the controlling unit. Once the control circuit is disabled, the switching power conversion circuit could be disabled. Moreover, the power-status detecting circuit of the controlling unit generates a power-status detecting signal according to the power status of the system circuit. According to the power-status detecting signal, the control circuit 1 is intermittently enabled, so that the magnitude of the output voltage is not maintained at the rated value (or zero). In other words, the switching power conversion circuit of the present disclosure will be adaptively disabled without the need of adjusting the magnitude of the input voltage to be zero or interrupting the input voltage. As a consequence, the switching power conversion circuit of the present disclosure could achieve a power-saving purpose. Moreover, the switching power conversion circuit of the present disclosure could be applied to a power supply. When the electronic device in not in use, the power supply is disabled and thus the power supply does not need to be disconnected from the power socket to interrupt the input voltage. In other words, the power supply of the present disclosure could also achieve a power-saving purpose.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A switching power conversion circuit for receiving the energy of an input voltage and generating an output voltage to a system circuit, said switching power conversion circuit comprising:
    a first-stage power circuit configured to perform a power factor correction and convert said input voltage into a bus voltage, wherein said first-stage power circuit comprises a first switching circuit;
    a first feedback circuit connected to said first-stage power circuit for generating a first feedback signal according to said bus voltage;
    a second-stage power circuit connected to the first-stage power circuit for converting said bus voltage into said output voltage, wherein said second-stage power circuit comprises a second switching circuit;
    a second feedback circuit connected to said second-stage power circuit for generating a second feedback signal according to said output voltage; and a controlling unit connected to said first-stage power circuit, said second-stage power circuit, said first feedback circuit, said second feedback circuit and said system circuit for controlling the operations of said first-stage power circuit according to said first feedback signal, controlling the operations of said second-stage power circuit according to said second feedback signal and receiving a power-status signal issued from said system circuit, wherein said controlling unit comprises:
  a start-up circuit connected to said system circuit and a power input terminal of said switching power conversion circuit for converting said input voltage and generating a start-up voltage according to said power-status signal;
  a first control circuit connected to said first switching circuit, a first auxiliary power output terminal of said second-stage power circuit, an output terminal of said first feedback circuit, said system circuit and said start-up circuit, wherein said first control circuit issues a first pulse width modulation control signal according to said first feedback signal, and said first switching circuit is conducted or shut off according to said first pulse width modulation control signal; and
  a second control circuit connected to said second switching circuit, said first auxiliary power output terminal of said second-stage power circuit, an output terminal of said second feedback circuit and said first control circuit, wherein said second control circuit issues a second pulse width modulation control signal according to said second feedback signal, and said second switching circuit is conducted or shut off according to said second pulse width modulation control signal; and
wherein if said power-status signal is in an off status, said second-stage power circuit is disabled according to said power-status signal under the control of said controlling unit, thereby said switching power conversion circuit stops providing electrical energy to said system circuit.

2. The switching power conversion circuit according to claim 1, wherein if said power-status signal is in an on status, said start-up voltage having a non-zero voltage value is supplied to said first control circuit according to said power-status signal by said start-up circuit, wherein the energy of said start-up voltage is transmitted to said first auxiliary power output terminal of said second-stage power circuit by the control of said first control circuit, so that said first auxiliary voltage at said first auxiliary power output terminal of said second-stage power circuit is boosted to a voltage value higher than a first operating voltage value of said first control circuit, and wherein said first control circuit is enabled to control said second-stage power circuit to supply said output voltage and said first auxiliary voltage at the rated values to said system circuit, said first control circuit and said second control circuit.

3. The switching power conversion circuit according to claim 1, wherein if said power-status signal is in an off status, said first control circuit is disabled according to said power-status signal and said second control circuit is disabled under the control of said first control circuit, so that said switching power conversion circuit stops providing electrical energy to said system circuit.

4. The switching power conversion circuit according to claim 1, wherein second-stage power circuit further comprises:

a transformer comprising a primary winding coil, a secondary winding coil and an auxiliary winding coil, wherein said primary winding coil is connected to said second switching circuit;
a first rectifier and filter circuit interconnected between said secondary winding coil of said transformer and said system circuit for rectifying and filtering; and
a second rectifier and filter circuit interconnected between said auxiliary winding coil of said transformer and a first auxiliary power output terminal of said second-stage power circuit for rectifying and filtering,
wherein by conducting or shutting off said second switching circuit, electrical energy of said bus voltage is transmitted from said primary winding coil of said transformer to said secondary winding coil and said auxiliary winding coil of said transformer and respectively rectified and filtered by said first rectifier and filter circuit and said second rectifier and filter circuit, thereby generating said output voltage and a first auxiliary voltage.

5. The switching power conversion circuit according to claim 4 wherein said first rectifier and filter circuit comprises:
  a first diode having an anode connected to said secondary winding coil of said transformer and having a cathode connected to the power output terminal of the second-stage power circuit; and
  a first capacitor interconnected between said cathode of said first diode and a second common terminal.

6. The switching power conversion circuit according to claim 4 wherein said second rectifier and filter circuit comprises:
  a second diode having an anode connected to said auxiliary winding coil of said transformer and having a cathode connected to said first auxiliary power output terminal; and
  a second capacitor interconnected between said first auxiliary power output terminal of said second-stage power circuit and a first common terminal.

7. The switching power conversion circuit according to claim 1 wherein said second feedback circuit comprises:
  a first resistor having one end connected to said power output terminal of said second-stage power circuit;
  a second resistor interconnected between the other end of said first resistor and a second common terminal, wherein said first resistor and said second resistor collectively defines a first voltage-division circuit, and said output voltage is subject to voltage division by the first voltage-division circuit to generate a first divided voltage at a first connecting node between said first resistor and said second resistor;
  a first isolating element having an output side connected to said output terminal of said second feedback circuit, wherein according to the magnitude of a first current flowing into an input side of said first isolating element, said first isolating element generates said corresponding second feedback signal;
  a three-terminal adjustable voltage regulator having an anode, a cathode and a reference terminal, wherein said anode is connected to said second common terminal and said reference terminal is connected to said first connecting node, and wherein according to said divided voltage and a first reference voltage value of said three-terminal adjustable voltage regulator, the magnitude of said first current is automatically adjusted by said three-terminal adjustable voltage regulator, so that said output side of said first isolating element generates said second feedback signal according to said output voltage; and a third resistor, wherein said third resistor and said input side of said first isolating element are serially interconnected between said cathode of said three-terminal adjustable voltage regulator and said power output terminal of said second-stage power circuit for limiting the magnitude of said first current.

8. The switching power conversion circuit according to claim 1, wherein said first-stage power circuit further comprises:
- a first capacitor having one end connected to said power input terminal of said first-stage power circuit and having the other end connected to a first common terminal;
- a first inductor having one end connected to said one end of said first capacitor;
- a second capacitor having one end connected to said other end of said first inductor and having the other end connected to said first common terminal;
- a second inductor having one end connected to said other end of said first inductor and having the other end connected to said first switching circuit; and
- a first diode having an anode connected to said other end of said second inductor and having a cathode connected to said power output terminal of said first-stage power circuit.

9. The switching power conversion circuit according to claim 1, wherein said first feedback circuit further comprises:
- a first resistor having one end connected to said power output terminal of said first-stage power circuit;
- a second resistor having one end connected to the other end of said first resistor and having the other end connected to an output terminal of said first feedback circuit; and
- a third resistor having one end connected to the other end of said second resistor and said output terminal of said first feedback circuit, and having the other end connected to said first common terminal;
- wherein said first resistor, said second resistor and said third resistor collectively defines a first voltage-division circuit, and the bus voltage is subject to voltage division by said first voltage-division circuit to generate said first feedback signal between said second resistor and said third resistor.

* * * * *